United States Patent [19]
Wyrwas et al.

[11] Patent Number: 6,031,489
[45] Date of Patent: Feb. 29, 2000

[54] USER TERMINAL POSITIONING SYSTEM AND METHOD EMPLOYING EXTERNAL SIGNALS

[75] Inventors: Richard Wyrwas, London; Thomas Goerke, Middlesex, both of United Kingdom

[73] Assignee: ICO Services Ltd., London, United Kingdom

[21] Appl. No.: 09/016,630

[22] Filed: Jan. 30, 1998

[30] Foreign Application Priority Data

Feb. 1, 1997 [GB] United Kingdom .................... 9702706

[51] Int. Cl.[7] .................................. G01S 5/02; G01S 3/02
[52] U.S. Cl. .................................. 342/357.16; 342/357.09; 342/458
[58] Field of Search .................................. 342/357, 457, 342/357.01, 354, 357.1, 357.16, 357.09, 357.06, 386, 458

[56] References Cited

U.S. PATENT DOCUMENTS

| Re. 35,498 | 4/1997 | Barnard .................................... 342/357 |
| 5,515,062 | 5/1996 | Maine et al. . |
| 5,548,801 | 8/1996 | Araki et al. ........................... 455/13.1 |
| 5,731,785 | 3/1998 | Lemelson ................................ 342/357 |
| 5,859,612 | 1/1999 | Gilhousen ............................... 342/457 |

FOREIGN PATENT DOCUMENTS

| 0 467 651 A1 | 1/1992 | European Pat. Off. . |
| 0512789A2 | 5/1992 | European Pat. Off. . |
| 2 279 842 | 1/1995 | United Kingdom . |
| 2301725A | 12/1996 | United Kingdom . |
| WO87/06410 | 10/1987 | WIPO . |
| WO91/0862 | 6/1991 | WIPO . |
| WO92/21181 | 11/1992 | WIPO . |
| WO 93/13618 | 7/1993 | WIPO . |
| WO 94/15412 | 7/1994 | WIPO . |

OTHER PUBLICATIONS

Search report GB 9702706.4 Mar. 10, 1997.

*Primary Examiner*—Gregory C. Issing
*Attorney, Agent, or Firm*—McDermott, Will & Emery

[57] ABSTRACT

A communications satellite communications system and method, where a communications satellite 10 can pass messages between a user terminal 44 and an earth station 38, as the communications satellite moves in an orbit 12 12' as indicated by arrow 46, comprises means for estimating the position of the user terminal 44, on the surface of the earth 14, relative to the nadir 50, by means of doppler shift measurements and propagation delay measurements between the communications satellite 10 and the user terminal 44. Where more than one communications satellite 10 is visible to the user terminal 44, combination means are employed using propagation delays to plural communications satellites 10, and/or recordal of the receipt times, by the user terminal 44, of timed broadcasts from one or more communications satellites 10 to determine the propagation delay between the one or more communications satellites 10 and the user terminal 44. In addition, delay signals from navigational satellites 142 can be processed by the user terminal 44 measuring the time of arrival of signals from the navigational satellites 142 and conveying the identity of the navigational satellite and the arrival time of the signal to the earth station, which calculates the position of the user terminal 44 and can relay an idication thereof back to the user terminal 44.

27 Claims, 20 Drawing Sheets

USER TERMINAL POSITIONING SYSTEM AND METHOD EMPLOYING EXTERNAL SIGNALS

The present invention relates to satellite communication systems, and a method of operating such systems. The invention particularly relates to satellite communication systems and related methods where an earth based user terminal communicates with a satellite which in turn communicates with an earth station, and vice versa. Most particularly, the present invention relates to such a system and its related methods where there is a requirement for the location of the user terminal, on the surface of the earth, to be known to the earth station.

It is known, in a satellite communications, for a user terminal, perhaps in the form of a radio telephone handset, not dissimilar to a cellular radio telephone handset, to communicate with an earth station, via a satellite, to establish a telephone call or to receive a telephone call, by means of the earth station linking into the terrestrial wire and cable system or into another radio telephone system.

There are twin purposes relating to establishing the exact position of the user terminal on the surface of the earth. Firstly, in order to know how to direct a radio signal to or from a user terminal, when required, from particular satellite at a particular time, it is necessary to know the approximate location of the user terminal so that the appropriate beam from the appropriate satellite can be selected to cover the portion of the Earth's surface where the user terminal is located. Secondly, in a satellite communication system, in order that call barring, local billing or other restrictions based on the territory wherein the user terminal may be operated can be observed, it is necessary to determine the location of the user terminal with sufficient accuracy for the necessary restrictions to be imposed.

It is known to provide a user terminal where the individual user terminal employs "Global Positioning by Satellite" (GPS) to determine, with some great accuracy, the position of the user terminal on the surface of the earth. The user terminal then transmits, to the earth station, via the satellite or satellites involved in communications, its exact position which is then used by the earth station, in subsequent interactions with the user terminal, to control the fiscal and mechanical aspects of the communication activity with the user terminal. An example of such a system is to be found in European Patent EP 0562 374 by Motorola Corporation filed 27 Mar. 1993. The GPS system tends to be very slow of access, requires a very sophisticated receiver of a costly nature, and the GPS satellites can often be totally inaccessible to the user terminal, in sufficient simultaneous numbers for a position determination to be achieved. In addition, the accuracy of the position determination is well in excess of what is actually required for satellite communications purposes.

Such systems require enhanced complication of the handset, in order that the handset may be capable both of communications and of GPS measurements.

It is advantageous, therefore, to provide a system and method whereby the position, on the surface of the earth, of the user terminal or handset can be determined with sufficient accuracy for communication and fiscal purposes without undue complication of the handset or user terminal.

In another system, it is merely necessary for the satellite to receive a transmission from the user terminal, in response to the earth station, via the satellite, requesting radio communication from the user terminal, for the earth station to use the delay in response from the user terminal for ranging purposes and to use the doppler shift on the received frequency from the user terminal, together with a foreknowledge of the position and velocity of the satellite, to determine, with a certain degree of precision, the position of the user terminal on the surface of the earth.

Unfortunately, if the cost of the user terminal is to be kept at realistic limits, consistent with the trade in handheld mobile radio telephones, the accuracy of the crystal clock or other frequency source within the user terminal cannot be made consistent with sufficient accuracy of determination of the position of the user terminal, on the surface of the earth, for the functional and fiscal aspects connected with operation of a satellite telephone communication system.

According to one aspect, the present invention consists in a satellite communications system where an earth station is operative to exchange messages with a user terminal through a satellite, and to exchange messages with said satellite, to measure the position of the user terminal, said system being characterised by: said user terminal being operative to receive a signal, sent from a known position at a known time from a known autonomous source; said user terminal being operative to note the time of arrival of said signal; said user terminal being operative to communicate said time of arrival to said earth station; said earth station being operative to calculate the distance between said autonomous source and said user terminal; and said earth station being operative to incorporate said calculated distance in the estimation of said position of said user terminal.

According to another aspect, the present invention consists in a method for operating a satellite communications system where an earth station is operative to exchange messages with a user terminal through a satellite, and to exchange messages with said satellite, to measure the position of the user terminal, said method including the steps of: said user terminal receiving a signal, sent from a known position at a known time from a known autonomous source; said user terminal noting the time of arrival of said signal; said user terminal communicating said time of arrival to said earth station; said earth station calculating the distance between said autonomous source and said user terminal; and said earth station incorporating said calculated distance in the estimation of said position of said user terminal.

The invention also provides a system and method wherein said autonomous source, in said signal, is operative to provide indication of its identity, wherein said user terminal is operative to detect said identity, and wherein said user terminal is operative to convey, to said earth station, indication of said identity.

The invention further provides a system and method wherein said autonomous source is operative, in said signal, to provide indication of the time of origin of said signal from said autonomous source, and wherein said user terminal is operative to convey, to said earth station, indication of said time of origin of said signal from said autonomous source.

The invention, yet further, provides a system and method wherein said autonomous source is a satellite in a constellation other than that occupied by said communications satellite.

The invention, still further, provides a system and method wherein said autonomous source can be a navigational satellite.

Yet further, the invention provides a system and method wherein said autonomous source can be a terrestrial, low frequency time station.

The invention further provides a system and method wherein the navigational satellite is one of a constellation comprising a plurality of navigational satellites.

In addition, the invention also encompasses a system and method wherein said user terminal is operative to respond to any of said plurality of navigational satellites from which a signal can be received and wherein said earth station is operative to respond to information, received from said user terminal, concerning any of said plurality of navigational satellites from which a signal can be received by said user terminal.

Further, the invention provides a system and method wherein said earth station is operative to indicate, to said user terminal, those out of said plurality of navigational satellites which are potentially within range of sending a signal to said user terminal, and wherein said user terminal is responsive thereto to restrict potential reception of signals to signals originating from those navigational satellites, indicated by said earth station.

Additionally, the invention provides a system and method wherein said indication of those out of said plurality of navigational satellites which are potentially within range of sending a signal to said user terminal are broadcast, by said communications satellite, to all or a plurality of user terminals within communications range of said communications satellite. The invention further provides a system and method wherein said user terminal is operative to commence a timing operation on receipt of a message from said earth station, wherein said user terminal is operative to terminate said timing operation on receipt of a signal from said autonomous source, wherein said user terminal is operative to employ the measured, elapsed time of said timing operation as said time of arrival of said signal at said user terminal, and wherein said earth station is operative to use the propagation delay between said earth station, via said communications satellite, to said user terminal, to deduce the true time of arrival of said signal at said user terminal.

The invention, still further, provides a system and method wherein said user terminal is operative to respond to plural signals from said autonomous source and wherein said earth station is operative to incorporate each instance of receipt of a signal from said autonomous source into said estimation of said position of said user terminal.

Finally, the invention provides a system and method wherein said user terminal is operative to respond to plural signals from each of said plurality of navigational satellites and wherein said earth station is operative to incorporate each instance of receipt of a signal from each of said plurality of navigational satellites into said estimation of said position of said user terminal.

The invention is further explained, by way of example, by the following description, taken in conjunction with the appended drawings, in which.

Figure 1:
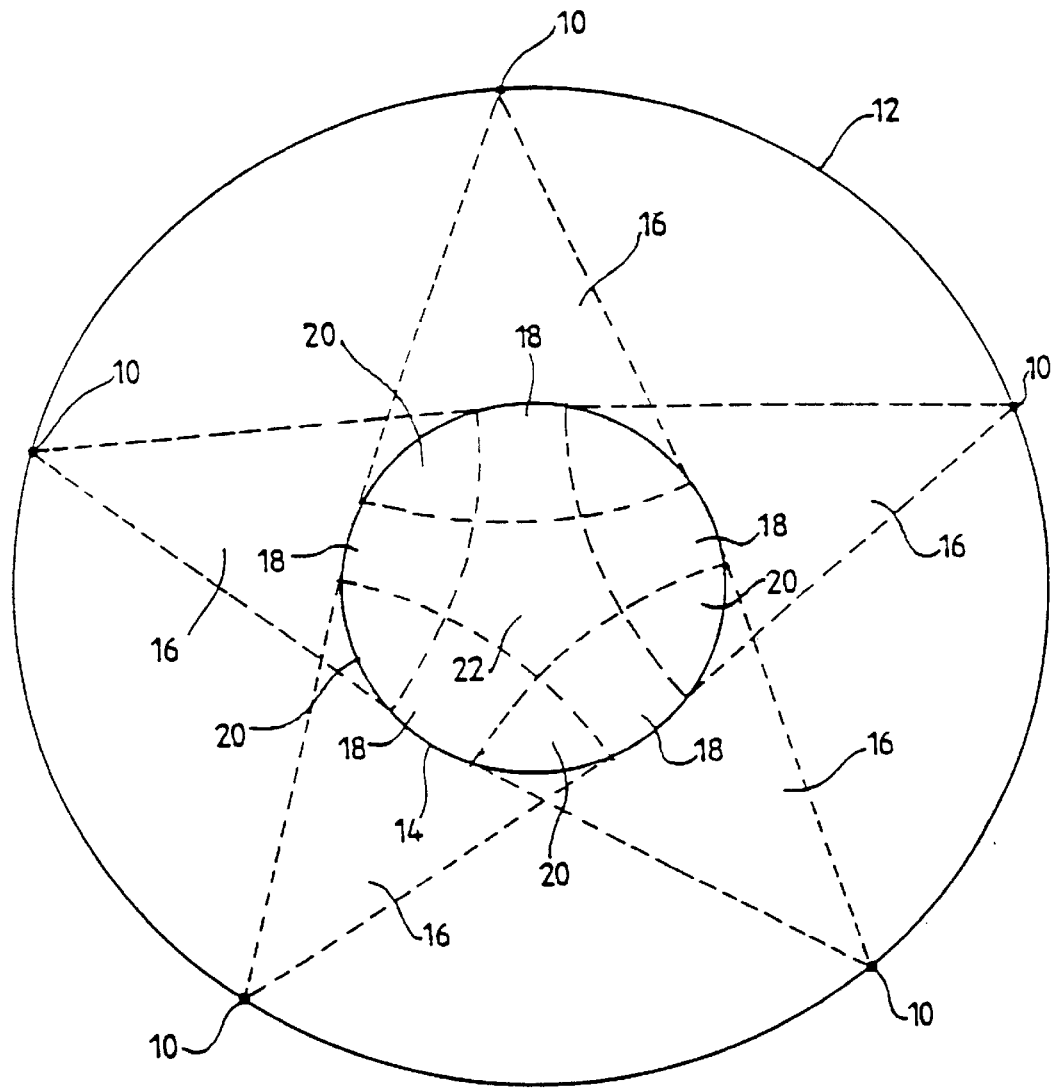
FIG. 1 shows a planar constellation of communications satellites disposed about the earth.

Attention is firstly drawn to FIG. 1.

FIG. 1 shows a planar constellation of communications satellites disposed about the earth.

The plurality of communications satellites 10 are evenly disposed around a circular orbit 12 above the surface of the earth 14. Each of the communications satellites 10 is designed to provide radio communications with apparatus on the surface to the earth 14 when the individual communications satellite 10 is more than 10 degrees above the horizon. Each communications satellite 10 therefore provides a cone 16 of radio coverage which intersects with the surface of the earth 14.

The surface of the earth has three types of areas. A first type of area 18 is one which has radio coverage from only one communications satellite 10. A second type of area 20 is an area where there is radio coverage from more than one communications satellite 10. Finally, a third type of area 22 receives radio coverage from none of the communications satellites 10 in the orbit 12 shown.

Figure 2:
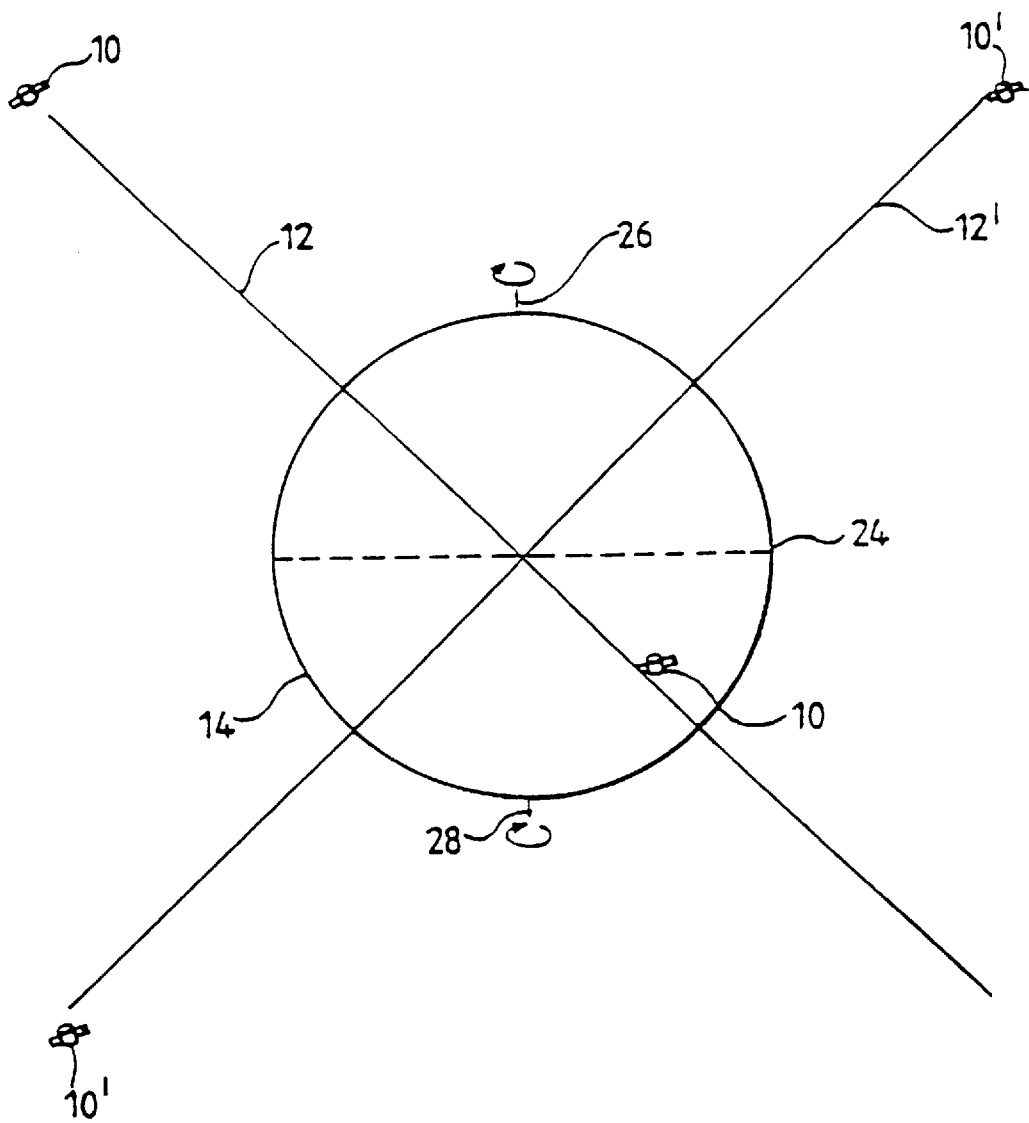
FIG. 2 illustrates how the communications satellites are disposed in orthogonal orbital planes.

FIG. 2 illustrates how the communications satellites 10 are disposed in orthogonal orbital planes.

The first orbit 12 of FIG. 1 is supplemented by a second orbit 12' having communications satellites 10 disposed there about in a similar manner to that shown in FIG. 1. The orbits 12' are orthogonal to one another, each being inclined at 45 degrees to the equator 24 and having planes which are orthogonal (at 90 degrees) to each other.

In the example shown, the communications satellites 10 orbit above the surface of the earth 14 at an altitude of 355 km. Those skilled in the art will be aware that other orbital heights and numbers of communications satellites 10 may be used in each orbit 12, 12'. This configuration is preferred because the example provides global radio coverage of the earth 14, even to the north 26 and south 28 poles, with a minimum number of communications satellites 10. In particular, the orthogonality of the orbits ensures that the communications satellites 10 of the second orbit 12' provides radio coverage for the third types of area 22 of no radio coverage for the communications satellites in the first orbit 12, and the communications satellites 10 in the first orbit 12 provide radio coverage for those areas 22 of the third type where the communications satellites 10 of the second orbit 12' provide no radio coverage. By such an arrangement, it is ensured that every point, on the surface of the earth 14, has, at least, one communications satellite 10 10', visible at all times.

It will become clear that, although the two orbits 12, 12' are here shown to be of the same radius, the invention as hereinbefore and hereinafter described will function with orbits 12, 12' of different radii. Equally, there may be more than two orbits 12, 12'. So far as the present invention is concerned, the only requirement is that every part of the surface of the earth 14 is in receipt of radio coverage from at least one communications satellite 10 at all times.

Figure 3:
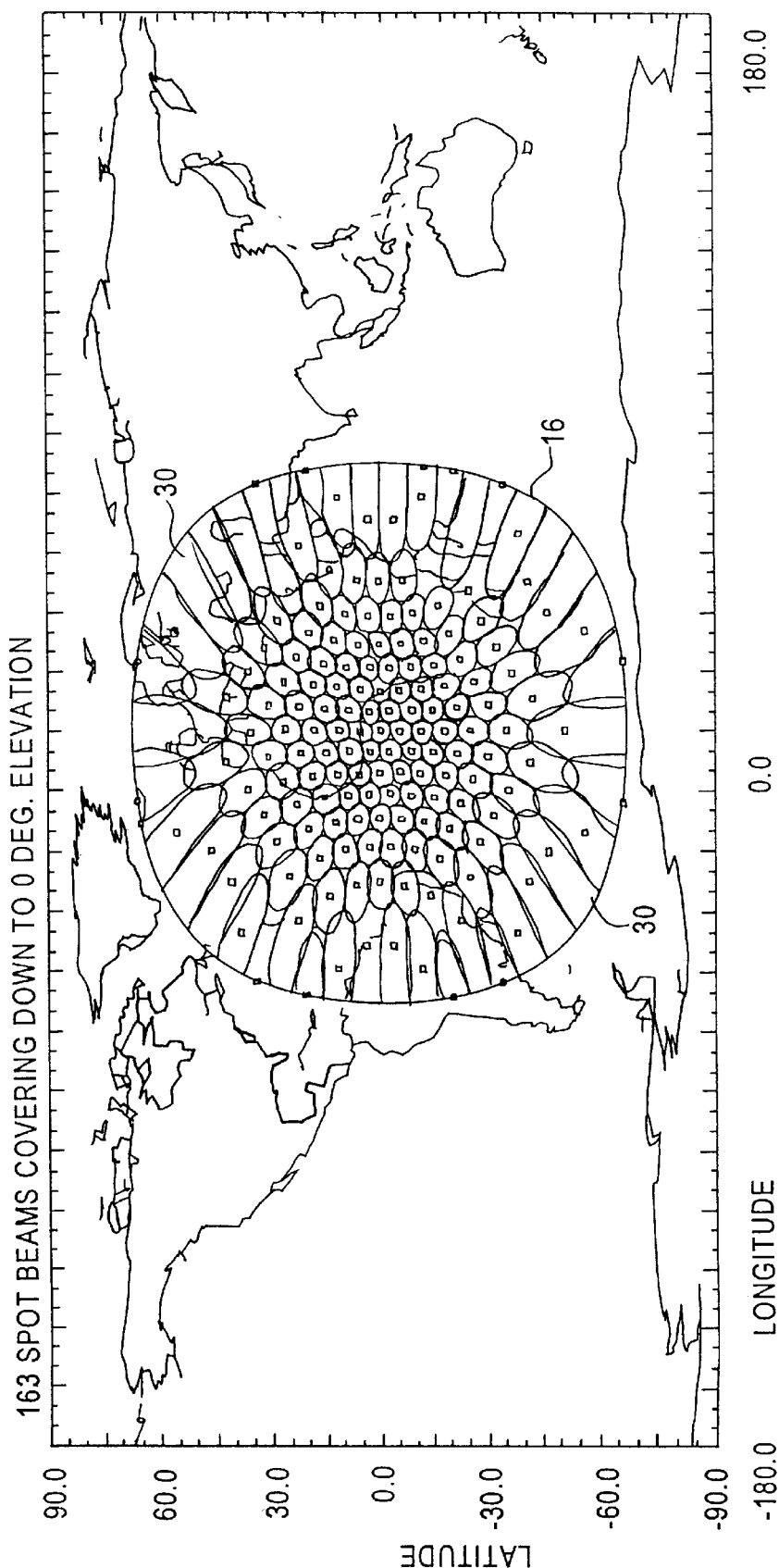
FIG. 3 shows the structure of the cone of radio coverage provided by each communications satellite.

FIG. 3 shows the structure of the cone 16 of radio coverage provided by each communications satellite 10. For convenience, the radio coverage cone 16 is shown centred, on a map of the earth, at latitude 0 degrees at longitude 0 degrees. The cone 16 of radio coverage is divided into a plurality of spot beams 30, by means of a corresponding plurality of directional antennae on the communications satellite 10. The communications satellite 10 is intended for mobile radio telephone communications and each of the spot beams 30 corresponds, roughly, to the equivalent of a cell in a cellular radio telephone network. In FIG. 3, the cone of radio coverage 16 is distorted due to the geometry of the map of the earth's surface provided. FIG. 3 also shows the extent of interaction of the cone 16 of radio coverage down to the edges of the cone 16 being tangential to the earth's surface, that is, to the point where the cone 16 represents a horizontal incidence at its edges, with the surface of the earth. By contrast, FIG. 1 shows the cone 16 at a minimum of 10 degrees elevation to the surface of the earth.

It is to be observed, that because of the curvature of the earth, the spot beams 30 are of near uniform, slightly overlapping circular shape at the centre whereas, at the edges, the oblique incidences of the spot beams 30 onto the surface of the earth 14 causes considerable distortion of shape.

Figure 4:
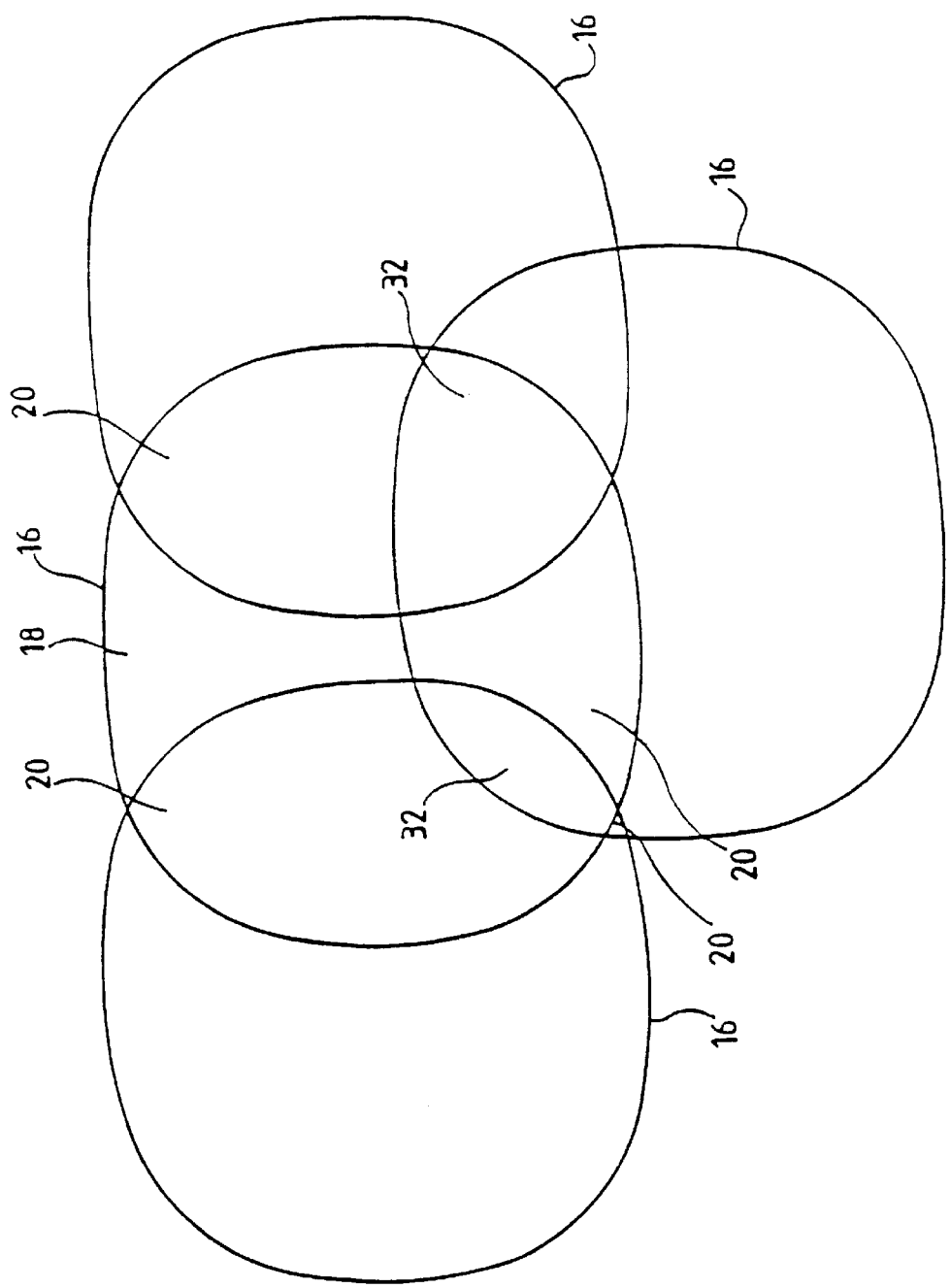
FIG. 4 shows how the cones of radio coverage, shown in FIG. 3 may interact with the surface of the earth to produce many types of different regions.

FIG. 4 shows how the cones 16 of radio coverage may interact with the surface of the earth to produce many types of different regions.

As discussed with reference to FIG. 1, numerous cones or radio coverage 16 may overlap to produce first areas 18 where there is radio coverage by only one communications satellite, second areas 20 where there is radio coverage by two communications satellites, and even fourth areas 32 where coverage is provided by three or more communications satellites. It is to be understood that each of the cones 16 of radio coverage represented in FIG. 4 is divided, as shown in FIG. 3, into its own independent set of spot beams 30.

Figure 5:
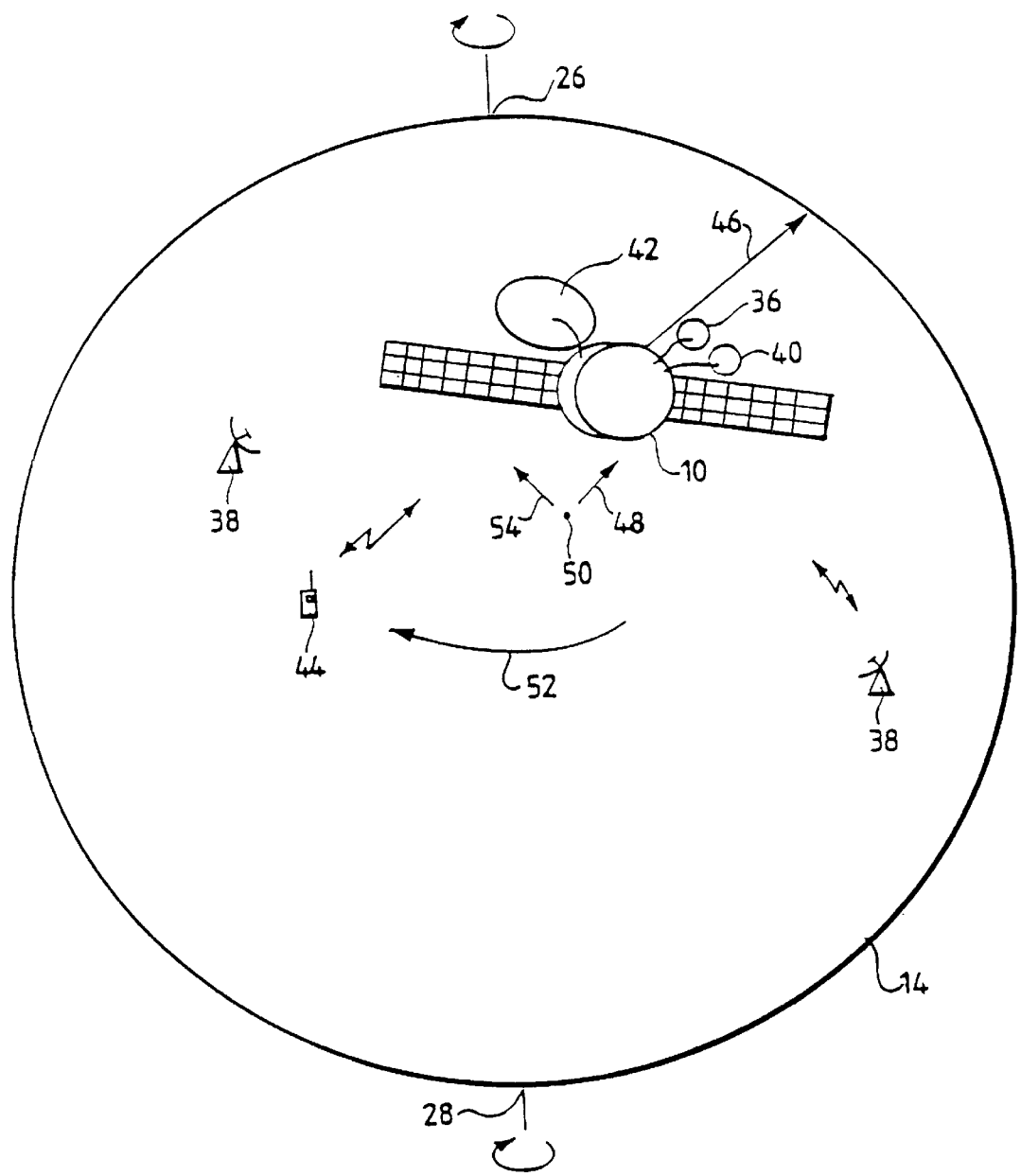
FIG. 5 is a view, from above, of a communications satellite above the surface of the earth, illustrative of the various motions relative to the earth.

FIG. 5 is a view, from above, of a communications satellite 10 above the surface of the earth.

The communications satellite 10 comprises solar panels 34 for power supply, a downlink antenna 36 for sending bulk telephone traffic to one of a plurality of earth stations 38, an uplink antenna 40 for receiving general traffic from the earth stations 38, and a subscriber antenna 42 which provides the plurality of spot beams 30, shown in FIG. 3, intended to provide communications with user terminals 44 which may be provided in a form not dissimilar to a hand held cellular radio telephone. It is to be understood that the user terminal 44 may also comprise more elaborate vehicle mounted equipment for use in land vehicles, ships and aircraft.

With the parameters mentioned in this preferred example, the communications satellite moves around its orbit 12 12', as indicated by a first arrow 46, with a velocity of 4.9 km per second. Ignoring for the moment the rotation of the earth 14, the spot beams 30 also move across the surface of the earth 14 with a similar velocity along a ground track as indicated by a second arrow 48. The point immediately beneath the communications satellite, is known as the nadir 50.

At the same time the earth 14 is rotating, at its equator with a velocity of 0.47 km per second, as indicated by a third arrow 52. Directions, relative to the ground track 48, at 90 degrees thereto, are termed crosstrack as indicated by a fourth arrow 54. Hereinafter, the position of the user terminal 44 is defined with reference to its distance along the ground track 48 and its distance along the cross track 54 with reference to the nadir 50.

Figure 6:
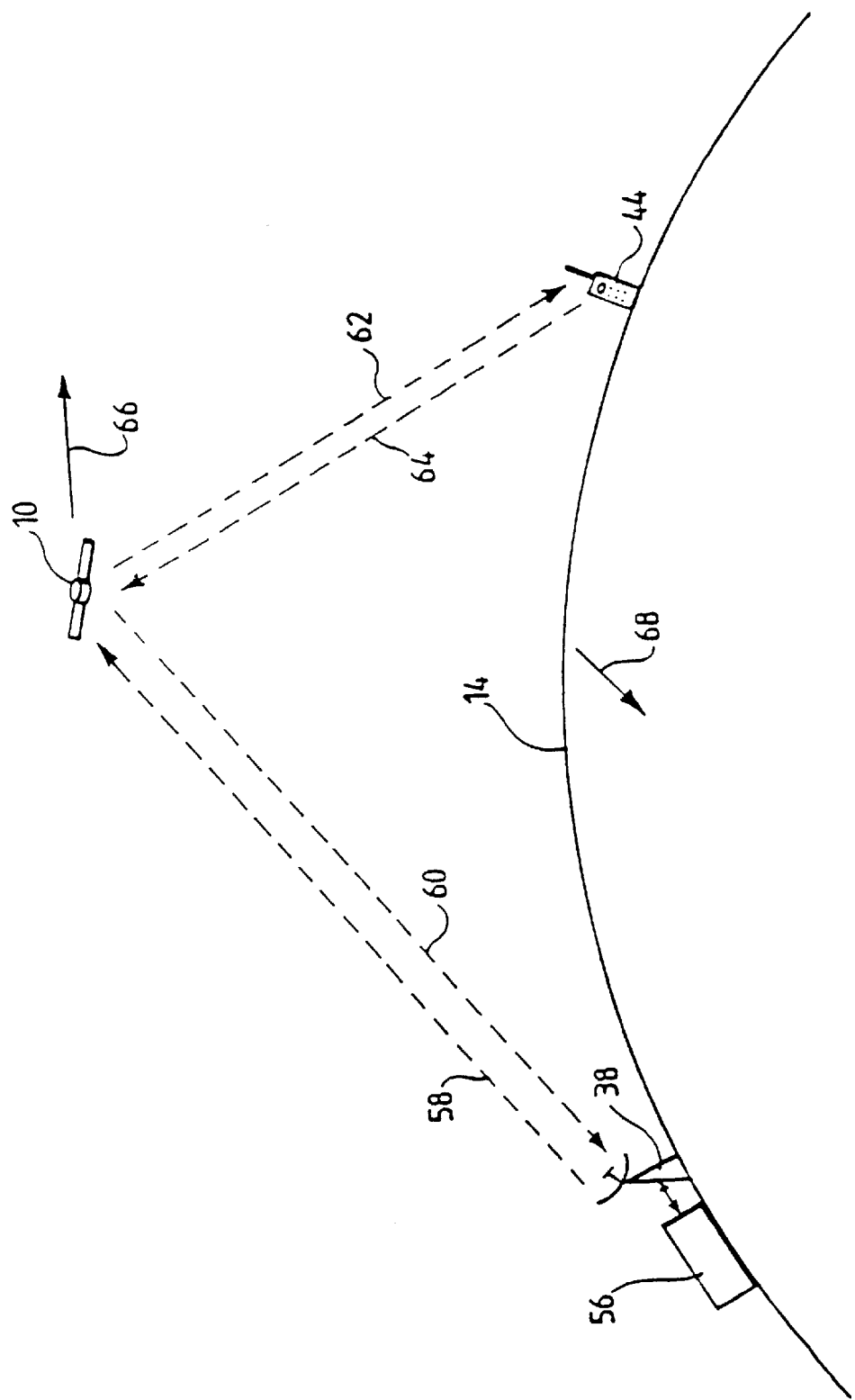
FIG. 6 is a schematic view of the general situation where an earth station talks to a user terminal via the communications satellite to determine propagation delays between the user terminal and the communications satellite.

FIG. 6 is a schematic view of the general situation where an earth station 38 talks to a user terminal 44 or via the communications satellite 10.

The earth station 38 further comprises an earth station controller 56 which controls the activity of the earth station 38. The earth station 38 is located at a first point on the surface of the earth 14 and the user terminal 44 may be at any other point on the surface of the earth within range of the communications satellite 10 when the communications satellite 10 is in range of the earth station 38.

The earth station 38 communicates with the communications satellite 10 via an uplink radio link 58, via the uplink antenna 40 of FIG. 5, using frequencies in the band 5150 to 5250 megahertz. The earth station 38 receives signals from the communications satellite 10 via the downlink antenna 36 of FIG. 5 on a downlink radio link 60 using signals in the frequency range 6975 to 7075 megahertz.

The user terminal 44 receives signals from the communications satellite 10 via a user terminal downlink 62 using frequencies in the range 2170 to 2200 megahertz. The user terminal 44 sends messages and signals to the communications satellite 10 via a user terminal uplink 64 operating in the frequency band 1980 to 2010 megahertz. These frequencies are merely exemplary and those skilled in the art will be aware from the following description, that the invention could be practised using numerous other frequencies for the uplinks and downlinks.

Implicit in FIG. 6, but not specifically shown, is the fact that communications satellite 10 contains its own precise oscillator, conveniently in the form of a crystal oscillator, which the communications satellite 10 uses for converting the frequencies of incoming and outgoing signals and for use as a frequency reference when synthesising frequencies. Likewise, the user terminal 44 contains its own internal synthesised oscillator, working from a master oscillator, preferable a crstal oscillator, for converting frequencies or incoming sinals and synthesising the frequencies of outgoing signals.

Equally, the earth station 38 and the earth station controller 56 between them contain, or have access to, extremely precise frequency references and time references. These references may actually be contained within the earth station 38 and the earth station controller 56, or may be derived from elsewhere via a land line or other service.

The exact location, on the surface of the earth 14, of the earth station 38, is known with great precision. Likewise, the parameters or the orbit 12 12' of the communications satellite 10 and its position in that orbit, at any instant, are also known with great precision. The uncertain element, which is the purpose of the present invention to resolve, is the position of the user terminal 44 on the surface of the earth 14.

Not previously mentioned, is the fact that the user terminal 44 transmits on the user terminal uplink 64 to the subscriber antenna 42 and similarly receives on the user terminal downlink link 62 from the subscriber antenna 42. The communications satellite 10 will only be in communication with one earth station 38 at a time, but may be in communication with a great many user terminals 44. Each user terminal will be in one particular spot beam 30 of the plurality of spot beams shown in FIG. 3.

The communications satellite 10 will be moving relative to the surface of the earth 14, and therefore relative to the earth station 38 and to the user terminal 44, as indicated in a fifth arrow 66. Likewise, the surface of the earth 14 will be moving relative to the orbit 12 12' of the communications satellite 10 as generically indicated by a sixth arrow 68.

The signals exchanged between the earth station 38 and the communications satellite 10, in common wish the signals exchange between the user terminal 44 and the communications satellite 10, all enjoy a propagation delay and a frequency shift, due to the motion of the communications satellite 10 relative to the earth station 38 and to the user terminal 44 caused by the doppler effect. The present invention in part concerns itself with means of employing the doppler shift in frequencies, due to the motion of the communications satellite 10, and measurement of the propagation delay, to determine the position of the user terminal 44 on the surface of the earth 14.

Propagation delay is measured between the earth station 38 and the user terminal 44 to establish the propagation delay between the user terminal and the communications satellite 10. The earth station 38 sends out a signal on the uplink radio link 58 to the communications satellite 10 which is, in turn, sent to the user terminal 44 via the user terminal downlink 62. Upon receipt of the signal from the earth station 38, the user terminal waits for a predetermined period and then sends its own message, via the user terminal uplink 64 and the downlink radio link 60, back to the earth station 38. The earth station controller 56 notes the elapse of time from the instant that the earth station 38 began to transmit the message on the uplink radio link 58 and the instant when the earth station 38 began to receive the response message from the user terminal 44 from the downlink radio link 60. The earth station controller 56 knows the propagation delay times for signals, through the communications satellite 10, from the uplink radio link 58 onto the user terminal downlink 62 and, correspondingly, the propagation delay through the communications satellite 10 between the user terminal uplink 64 and the downlink radio link 60. Equally, the earth station controller 56 knows, with precision, the predetermined elapsed time employed by the user terminal 44 before it responds to the received message from the earth station 38. These propagation delays and the predetermined delay of the user terminal 44 are subtracted, by the earth station controller 56, from the overall elapsed time to determine the actual propagation delay of the radio wave via the various links 58, 60, 62, 64 in the return journey of the message from and to the earth station 38. The radio wave propagates always at the speed of light, which is constant. Because the position of the earth station 38, on the surface of the earth, is precisely known, and because the position of the communications satellite 10 in its orbit 12 12' is also precisely known, the sum of the propagation delays on the uplink radio link 58 and the downlink radio link 60 can be precisely calculated. The earth station controller 56 is already aware of the over all elapsed time for the propagation of the message along the radio paths 58, 60, 62, 64. By subtracting the calculated delay on the radio path 58 60 between the earth station 38 and the communications satellite 10 from the overall propagation delay, the propagation delay between the user terminal 44 and the communications satellite 10 may precisely, be measured. This means that, since the propagation is entirely at the speed of light, the linear distance between the communications satellite 10 and the user terminal 44 is known. According to the propagation delay, the user terminal may exist on any point of a spherical surface centred on the communications satellite 10. Because the spherical surface intersects the surface of the earth 14, and the user terminal 44 is on the surface of the earth, the location of the user terminal 44 may be inferred as being on the line intersection of the spherical surface of the earth 14 and the sphere of measured distance centred on the communications satellite 10.

Figure 7:
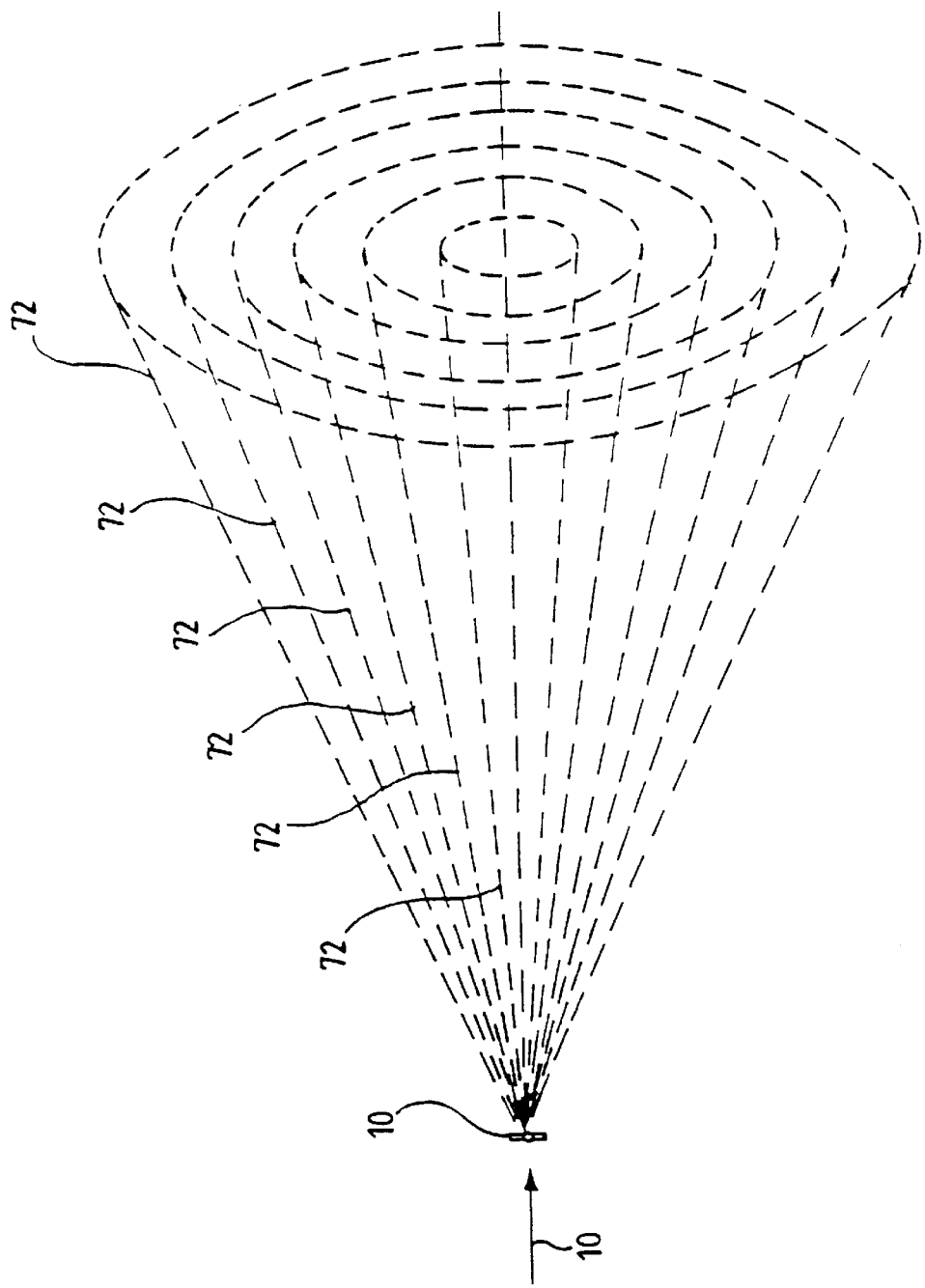
FIG. 7 shows the geometry of doppler frequency shift measurement for the communications satellite.

FIG. 7 shows the geometry of doppler frequency shift measurement for the communications satellite 10. As the communications satellite 10 moves as indicated by a 7th arrow 70, the change in frequency of a radio signal sent from the communications satellite 10 and the perceived frequency of a radio signal received by the communications satellite 10 from a fixed source such as the user terminal depends upon the cosin of the angle between the communications satellite 10 and the recipient of a transmitted radio signal from the communications satellite or the source of a transmitted radio signal to the communications satellite 10. Accordingly, if we plot those regions in space for pre-determined doppler frequency changes, there is obtained a series of coaxial cones 72 having the communications satellite 10 at their collective apex, extending towards infinity, and having, as their collected axis 74, the direction of the motion of the communications satellite 10 as indicated by the 7th arrow 70. FIG. 7 shows the cones 72 extending only for a finite distance. It is to be understood that the cones 72 are of infinite extension. Likewise, FIG. 7 has only shown the cones "in front" of the communications satellite for radio frequencies receivers or sources which the communications satellite 10 is approaching. It is to be understood that a corresponding set of coaxial cones 72 extend "behind" the communications satellite, having the same apex and axis. The doppler shift "in front" of the communications satellite 10 is shown by an increase in frequency. The doppler shift "behind" the communications satellite 10 is provided by a corresponding decrease in frequency.

Where the cones 72 cut the surface of the earth 14, for a particular doppler frequency shift, defines a further line along which the user terminal 44 may be located.

Referring again to FIG. 6, a doppler frequency shift measurement is executed by the earth station 38 providing a signal of known frequency on the uplink radio link 58. The communications satellite 10, using its own internal oscillator, translates the frequency of the signal and provides it on the user terminal downlink 62. The user terminal 44 then returns the signal via the user terminal uplink 64, once again to be converted in frequency by the internal oscillator of the communications satellite 10 and sent back to the earth station 38 via the downlink radio link 60. The earth station controller 56 measures the frequency of the downlink radio link 60 signal and deduces the doppler frequency shift, at the user terminal 44, resulting from the motion of the communications satellite 10 as indicated by the 5th arrow 66.

Figure 8:
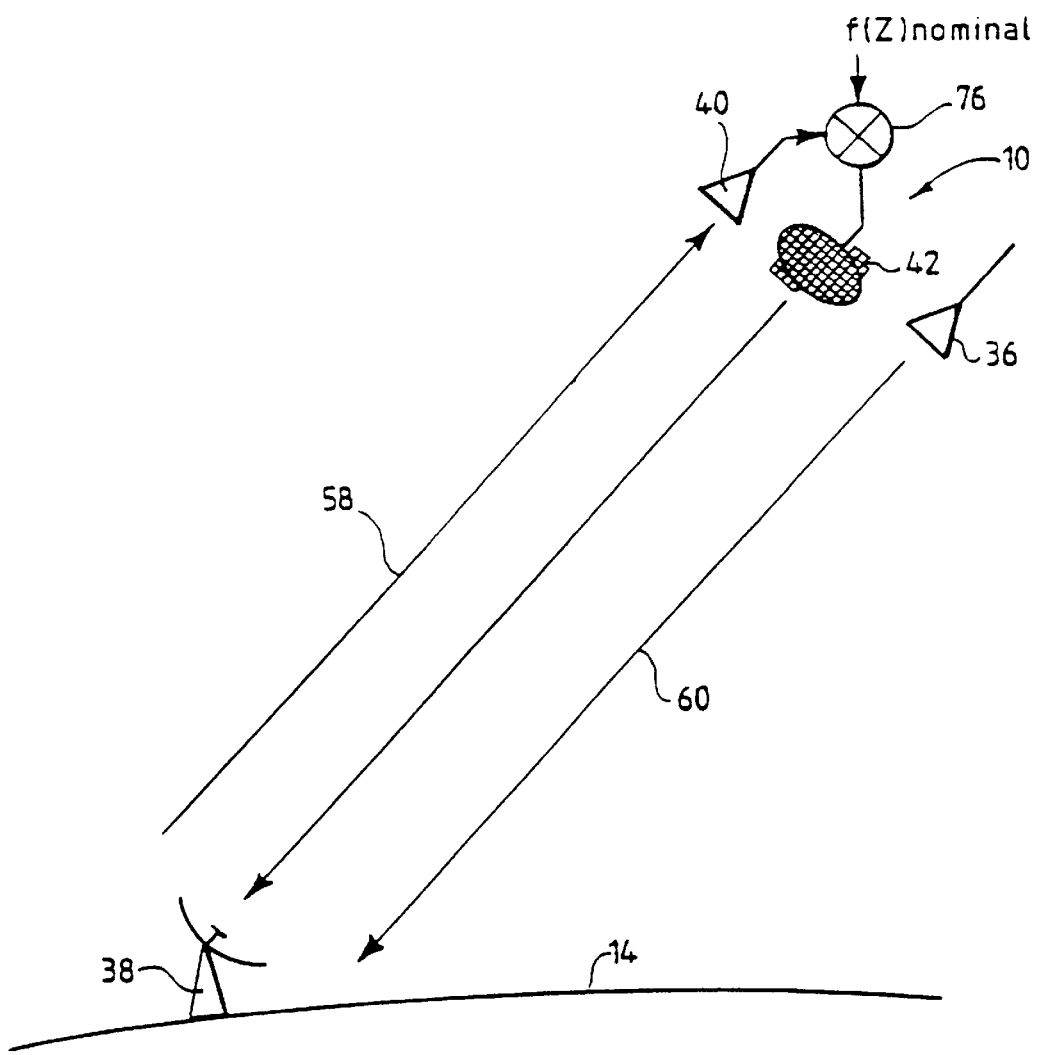
FIG. 8 is a schematic representation of the exchange of test signals between the earth station and the communications satellite to determine the relative doppler shift and internal oscillator error of the communications satellite.

FIG. 8 is a schematic diagram of the manner in which the earth station 38 and the earth station controller 56 interact with the communications satellite 10 to calibrate the errors and doppler shift experienced between the earth station 38 and the communications satellite 10.

The earth station 38 sends a signal of know frequency f(1) on the uplink radio link 58 to the communications satellite 10. The communications satellite 10 has an internal master oscillator which controls all of the synthesised frequencies used by communications satellite 10. If the master oscillator has a proportional error m, then any frequency, synthesised using the master oscillator, in the communications satellite, is proportionally in error, so that:

$$f(actual)=(1+m)f(intended)$$

Likewise, the communications satellite 10 is moving with respect to the earth station 38, thus introducing a proportional doppler shift, let us call it d, so that, no matter whether the signal goes from the earth station 38 to the communications satellite 10, or from the communications satellite 10 to the earth station 38:

$$f(received)=(1+d)f(sent)$$

Thus, if the earth station sends a frequency f(1) on the uplink radio link 58 to the communications satellite 10, because of doppler shift the communications satellite receives a frequency $$f(received\ at\ communications\ satellite)=f(1)(1+d)$$

Now, the communications satellite employs a frequency changer 76 to convert the signal, received from the earth station 38, to a frequency suitable for use via the subscriber antenna 42. In order so to do, the communications satellite 10 synthesises an intended frequency f(2) to be subtracted from frequency of the signal received at the communications satellite 10 from the earth station 38. The intended frequency f(2) is subject to the proportional error in the master oscillator on the communications satellite 10, and so becomes f(2)(1+m).

The output of the frequency changer 76 is thus:

$$f(1)\ (1+d)-f(2)\ (1+m)$$

and this is sent, back to the earth station 10, via the subscriber antenna 44. But the communications satellite 10 is moving, and thus imparts a further doppler shift. Thus, the frequency, received by the earth station 38 from the subscriber antenna 42, let us call it f(R1), is given by $$f(R1)=(1+d)(f(1)(1+d)-f(2)(1+m))$$

The earth station controller 56 measures f(R1) with extreme precision. Thus, f(R1), f(1) and f(2) are all known numbers, but m and d are unknown. Expanding the expression for f(R1) we obtain $$f(R1)=(f(1)-f(2))+d(2f(1)+d^2f(1))-mdf(2)-f(2)m$$

The second order terms $d^2f(1)$ and mdf(2) are insignificant compared to the other terms, and can be ignored. Thus $$f(R1)=f(1)-f(2)+d(2f(1)+(2)-mf(2))$$

The communications satellite 10 synthesises a third signal, with frequency f(3), which it sends via the downlink radio link 60 to the earth station 38. The third signal f(3) is subject to the proportional error of the master oscillator in the communications satellite 10. Thus, the actual frequency sent on the downlink radio link 60 becomes:

$$(1+m)f\ 3)$$

Since the communications satellite 10 is moving, the signal on the downlink radio link 60 is also subject to doppler shift. The frequency, f(R2), received at the earth station 38 on the downlink radio link 60 is thus given by:

$$f(R2)=(1+d)(1+m)f(3)$$

thus $$f(R2)=f(3)+df(3)+mf(3)+mdf(3)$$

The second order term mdf(3) is very small compared to the other terms and can be ignored. This leaves the following equations.

$$f(R1)=f(1)-f(2)+d(2f(1)-f(2))-mf(2)$$

and $$f(R2)=f3(1+d+m)$$

Now, f(1), f(2) and f(3) are precisely know numbers and f(R1) and f(R2) are accurately measured and thus known. This reduces the equations to being two simultaneous equations in two unknowns, namely m and d, which can thus be solved for the unknowns.

Figure 9:
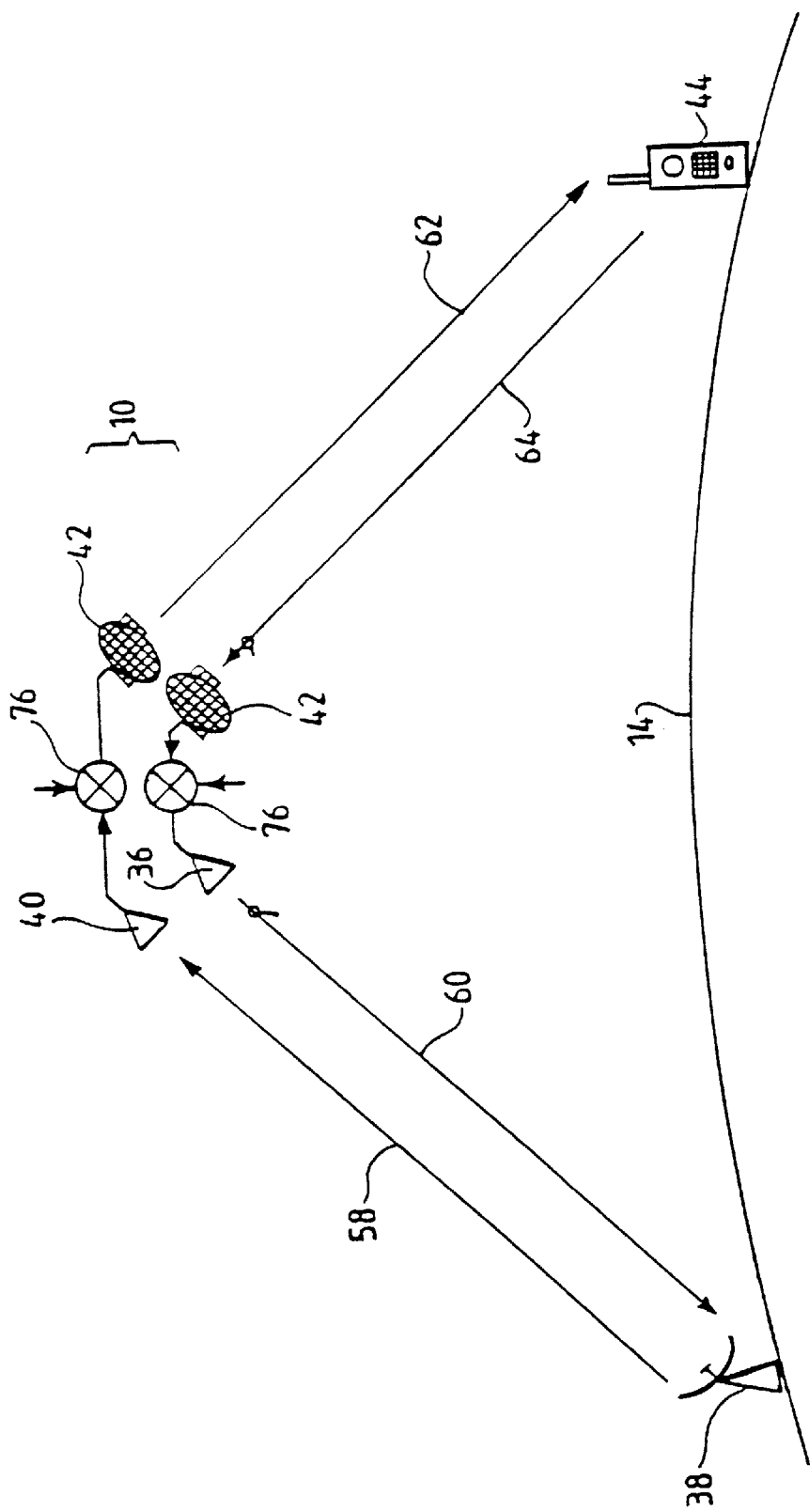
FIG. 9 is a schematic representation of how a calibrated communications satellite, according to FIG. 8, may, in turn, be used to determine the relative doppler shift between the communications satellite and user terminal and the internal oscillator error in the user terminal.

FIG. 9 is a schematic view of how the earth station 38 measures the proportional doppler shift error and master oscillator error on the user terminal 44.

The earth station 38 and the earth station controller 56 first 'calibrate' the communications satellite 10 as described with reference to FIG. 8. Being able to predict the behaviour the communications satellite 10, the earth station 38 effectively moves its point of operation from the surface of the earth 14 and places it at the communications satellite 10. The communications satellite 10 will show a different doppler shift with respect to the earth station 38 than it displays with respect to the user terminal 38.

The subscriber antenna 42 and the frequency changer 76 are shown twice in the communications satellite 10 simply to indicate that two paths exist, where the earth station 38 receives signals from the user terminal 44 via the communications satellite 10 and the earth station 38 sends signals to the user terminal 44 via the communications satellite 10.

Firstly, the earth station 38 sends a signal on the uplink 58 which is transposed by the frequency changer 76 and sent down on the user terminal downlink 62 to the user terminal 44. The user terminal 44 makes a measurement of the signal on the user terminal downlink 62, transposes its frequency by a nominal fixed amount and resends the transposed signal on the user terminal uplink 64 to the communications satellite 10 via the subscriber antenna 42 to be transposed via the mixer 76 and sent, via the downlink radio link 60, to the earth station 38 where the earth station controller 56 makes an accurate frequency measurement. The user terminal 44 also makes an independent transmission, via the communications satellite, as described, at a nominal frequency, known to the earth station 38 and its controller 56.

A moment of reflection will show that precisely the same method has been used by the earth station 38, extended via the 'calibrated' communications satellite 10, to measure the errors of the user terminal 44, as the earth station 38 used to 'calibrate' the communications satellite. There has been one loop - back frequency measurement, and one independent signal at a nominal synthesised frequency. The earth station controller 56 corrects for the 'calibration' of the communications satellite, and once again works out the two equations in two unknowns to solve for the communications satellite 10 to user terminal 44 doppler shift and to solve for the proportional error in the master oscillator in the user terminal 44.

Figure 10:
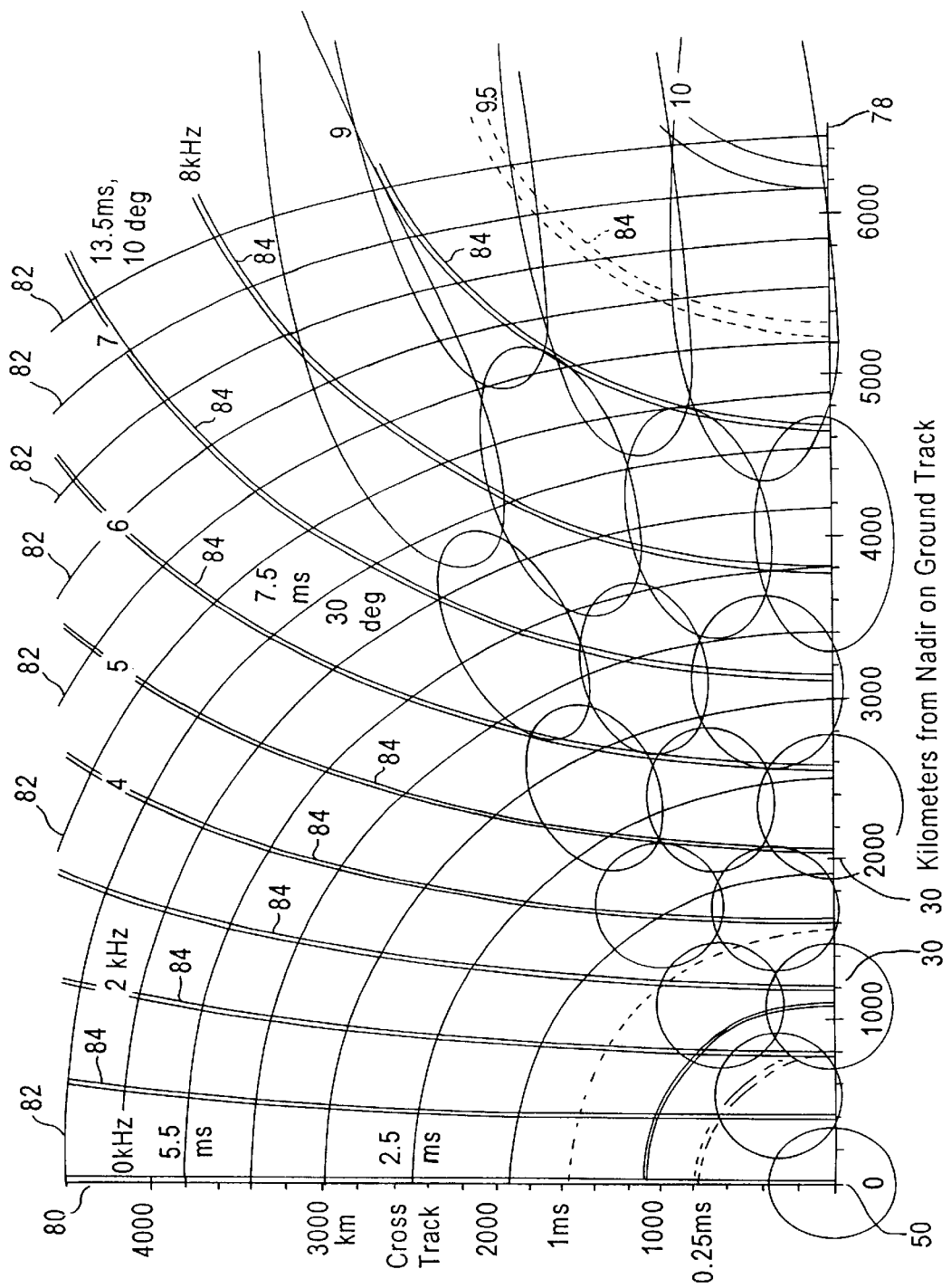
FIG. 10 shows how intersecting lines of measured doppler frequency shift and propagation delays may be used to measure the position of the user terminal on the surface of the earth.

FIG. 10 shows how measurement of Doppler frequency shift and delays can be used to locate a user terminal 44 on the surface of the earth 14.

In FIG. 10, the horizontal axis 78 corresponds to measurement in the direction of the second arrow 48 of FIG. 5 along the ground track. The vertical axis 80 corresponds to measurement along the cross track as indicated by the fourth arrow 54 in FIG. 6.

Only one quadrant is shown. It is to be understood that the pattern, as shown, is symmetrical about the axes in all four quadrants.

The delay measurements, described with reference to FIG. 6, create a series of delay contours 82, approximating to circles centred on the nadir 50 which corresponds to the point 00 in FIG. 10. Whereas the delay contours 82 represent the intersections of spheres of constant delay centred on the communications satellite, doppler contours 84 represent the lines of intersection of the plurality of coaxial cones 72 described in relation to FIG. 7. The figures given for the doppler contours relate to the doppler shift, in milliseconds, corresponding to the position, on the surface of the earth 14, where the user terminal 44 might be situated. Likewise, the figures adjacent to the delay contours 82 indicate the particular delay in milliseconds, for that particular delay contour 82 and that was the particular position on the surface of the earth 14. Various figures are shown in degrees, being the angle of elevation from the user terminal 44 to the communications satellite 10 if it were in that location. FIG. 10 extends out to a minimum elevation of 10 degrees, which, in this instance, is the operational minimal of the communications satellite communications system which holds the example given as the preferred embodiment of the present invention.

Also shown in FIG. 10, overlaid, are some of the spot beams 30 described with reference to FIG. 3 and 4. It is to be understood that spot beams 30 fill the entirety of the four quadrants. Only a few spot beams 30 have here been shown to avoid undue cluttering and complication of FIG. 10.

Essentially, on the basis of a single delay measurement as described with reference to FIG. 6, and a single Doppler frequency shift measurement as described with reference to FIG. 8 and 9, it is possible to estimate the position of the user terminal 44 on the surface of the earth 14 at that point where its particular delay contour 82 and Doppler contour 84 cross.

Because there exist 4 quadrants, there is a degree of ambiguity in determining which of the four quadrants the user terminal 44 might be situated. This is resolved by noting which of the plurality of spot beams 30 received the signal from the user terminal 44.

It is to be observed, in FIG. 10, that the Doppler contours 84 are in fact drawn as a pair of lines rather than a single line. This is to represent the proportional error in the measurement. Close to the nadir 50, the lines in the doppler contour 84 are close together indicating a small positional error. By contrast, at large distances along the ground track shown by the horizontal axis 78, the pairs of lines in the doppler contours 84 become wider apart indicating a greater error. By contrast, although the delay contours 82 are also pairs of lines indicating an uncertainty, in the accuracy of the measurement, the pairs of lines in the delay contours are much closer together.

In order to overcome the rather large errors in the doppler contours 84 at great distances along the ground track as indicated by the horizontal likes of 78, an averaging process in undertaken.

Figure 11:
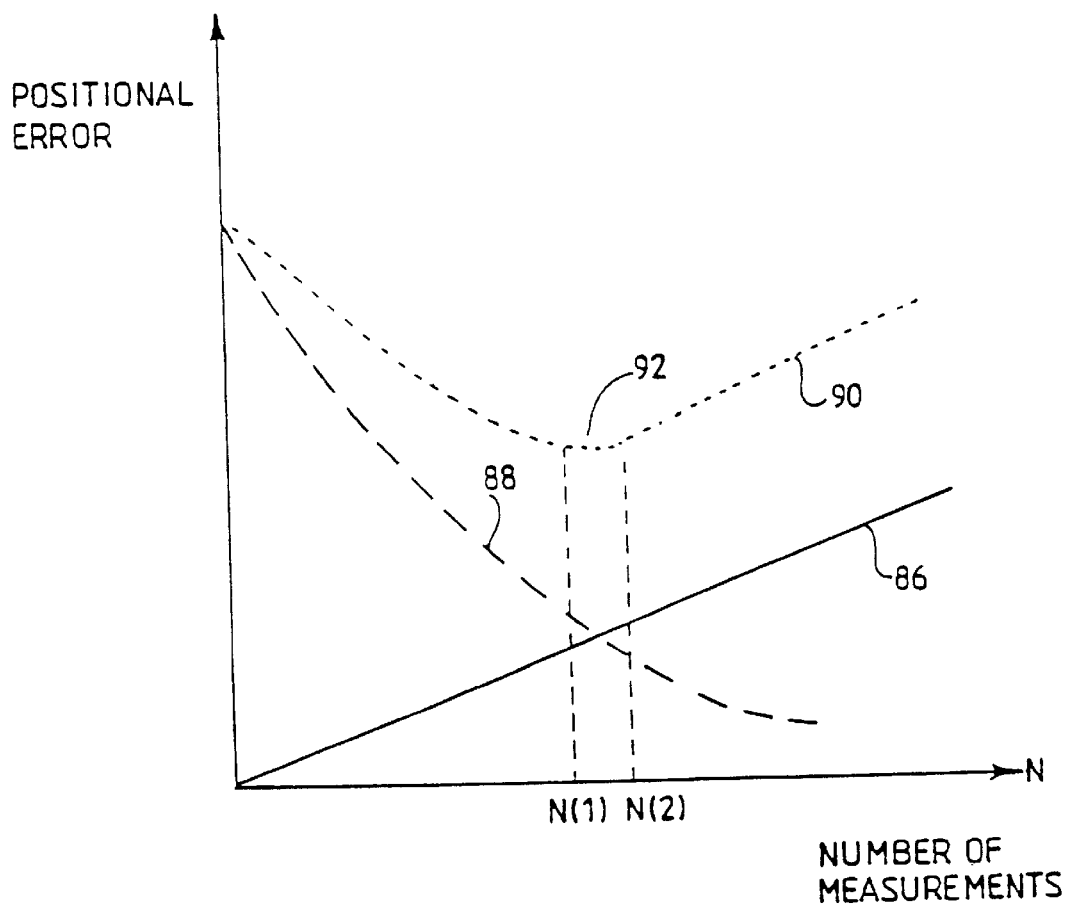
FIG. 11 is a graph showing the derivation of the optimal number of samples for best estimation of position.

FIG. 11 shows a surprising result. If no correction is made for the movement of the earth 14 relative to the nadir 50 of the communications satellite 10, or of the orbital velocity of the communications satellite 10 relative to the earth, the actual position of the user terminal 44, as shown in FIG. 11, relative to the communications satellite 10, steadily increases with time as shown by the solid line 86. Each measurement of the doppler shift and of the delay takes a predetermined period. Accordingly, the positional error as shown by the solid line 86 increases steadily with the number of measurements made.

The positional error, as measured, falls, by well known statistical principles, by the root of the sum of the squares. For example, if a hundred samples are taken, the average error falls to one tenth. If ten thousand samples are taken, the average error falls to one hundredth. If a million samples are taken, the average error falls to one thousandth, and so on. Broken line 88 indicates the falling rate of measured positional error against the number of samples.

The dotted line 90 represents the sum of the broken line 88 and the solid line 86 indicating the actual positional error against the number of samples. It is to be noted that there is a minimum region 92 where the measured positional error is at its least, fewer numbers of measurement producing a greater measured positional error, and greater numbers of measurements also producing a greater measured position error. It is to be observed that the minimum region 92 is quite flat and there are a range of values N(1) to N(2) between which the measured positional error is more or less at a minimum. An optimum number of numbers of measurements may thus be selected between the numbers N(1) and N(2) which will give the best positional estimation. The exact number of optimum measurements depends very much upon the initial measurement error. Returning, briefly, to FIG. 10, the slope of the broken line 88 representing the improvement of positional error in terms of the number of measurements taken, being a square root, it is to be observed that the delay contour lines 82 start off with a relatively small error so that, interpreting the graphs of FIG. 11, a relatively small number of measurements would be required to produce an optimum number of measurements. Conversely, the doppler contours 84, along the ground track is indicated by the horizontal axis 78 are relatively large so that the slope of the broken line 88 is relatively shallow, demanding a relatively large number of measurements to achieve a best estimation of positional error.

Figure 12:
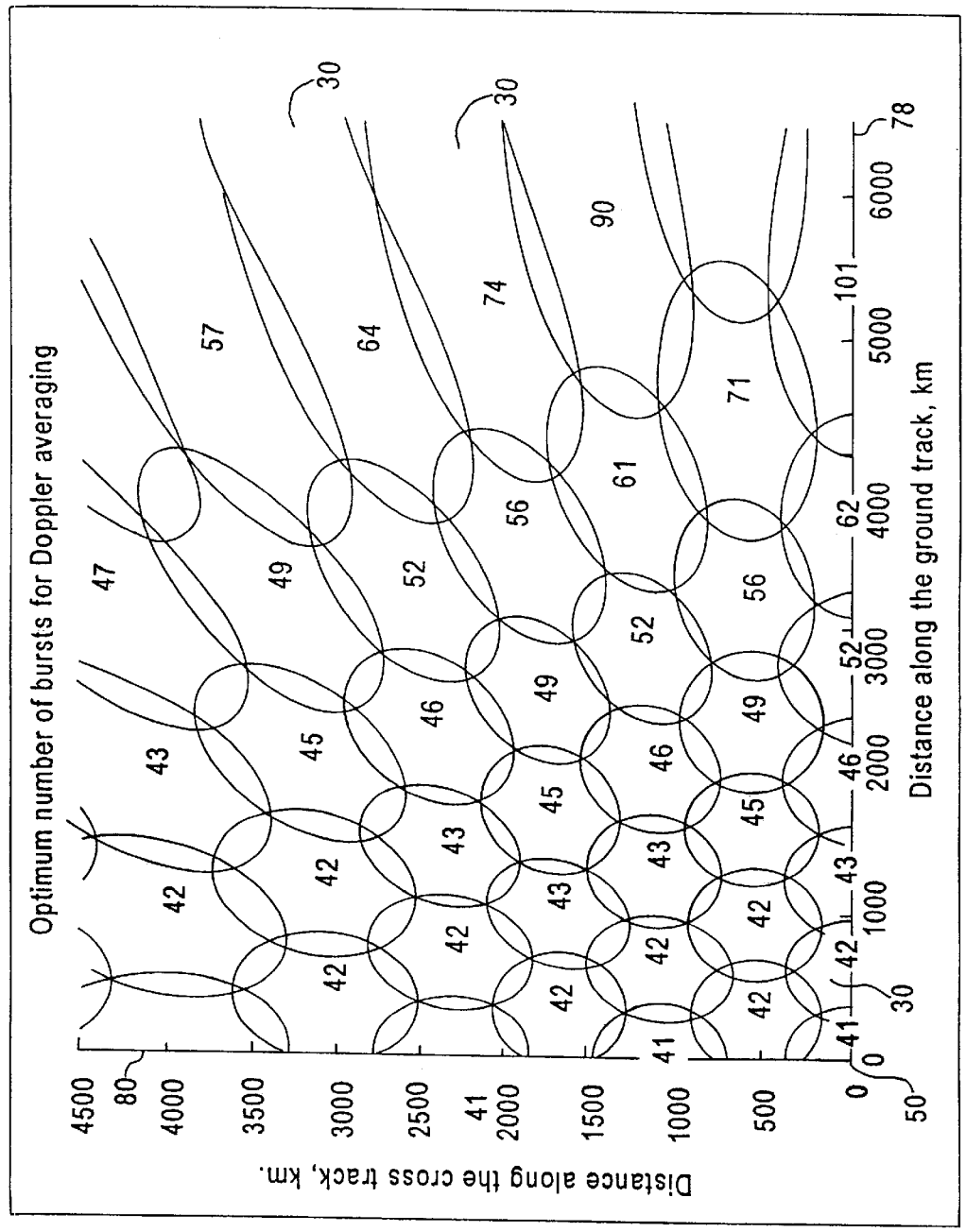
FIG. 12 is a chart showing, for the particular preferred embodiment, the derived optimal number of samples for doppler frequency shift averaging.

FIG. 12 is a first quadrant indication of the optimal number of measurements to be taken for each of the spot beams 30 depending upon the beam in which the user terminal 44 is found, for each of these spot beams 30, for doppler shift measurements, according to the preferred embodiment illustrating the present invention. It will be seen that numbers of optimum measurements range from 90 to 42. Other sampling rates and communications satellite orbital heights are chosen, other optimum numbers of measurement apply.

Figure 13:
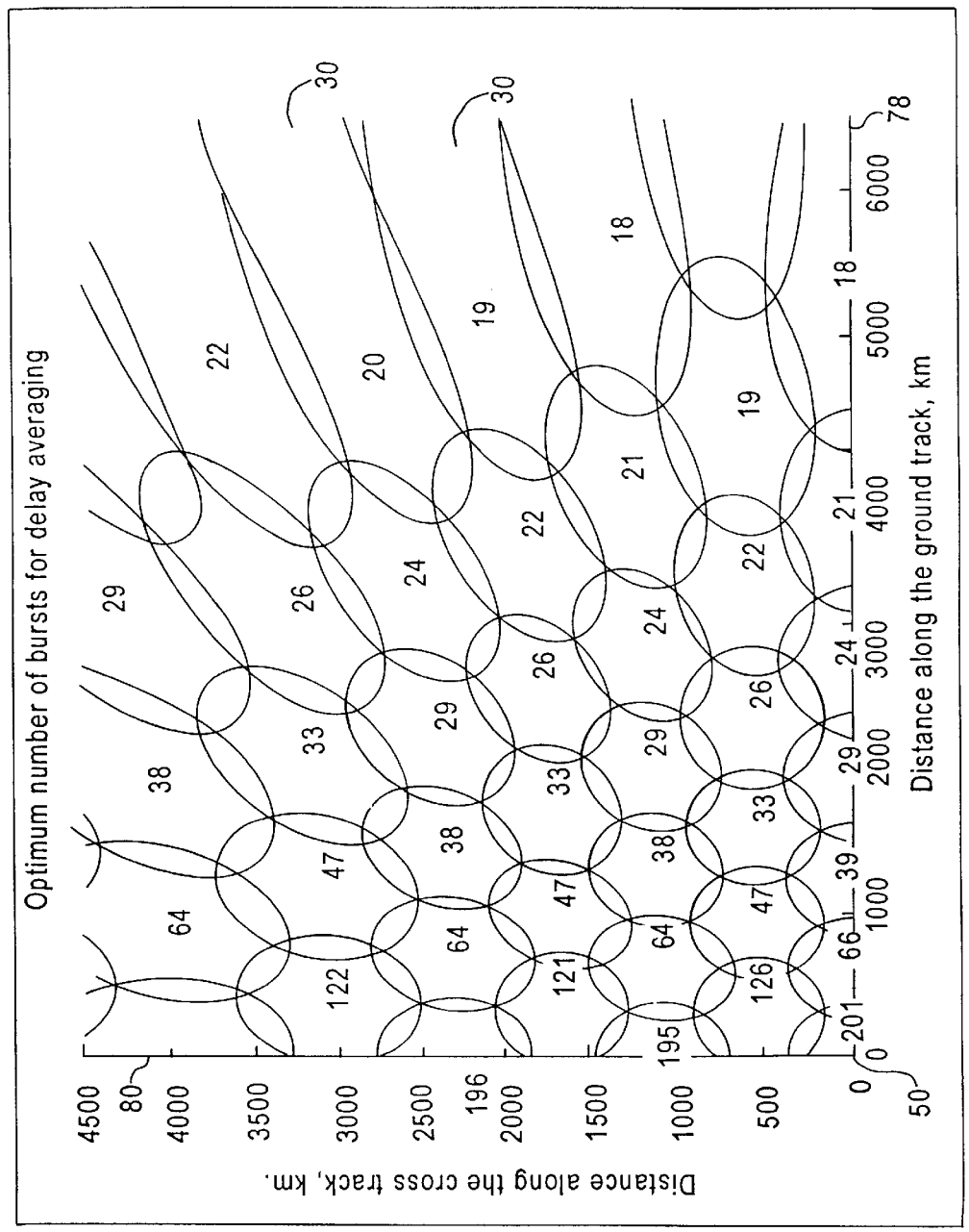
FIG. 13 is a chart showing, for the particular preferred embodiment, the derived optimal number of samples for propagation delay averaging.

Likewise, FIG. 13 shows the optimum number of bursts or samples for each of the spot beams 30 for delay measurements as described with reference to FIG. 6. Surprisingly, the optimum number of samples ranges from 201 near the nadir along the cross track as indicated by the vertical lines 80 and drops to surprising low values at the periphery of the spot beams 30.

The Foregoing description applies to those areas 18, as shown in FIGS. 1 and 4, as having single radio coverage from a communications satellite 10. The following description applies to those areas 20, shown in FIGS. 1 and 4, where there is multiple radio coverage from the communications satellite 10.

Figure 14:
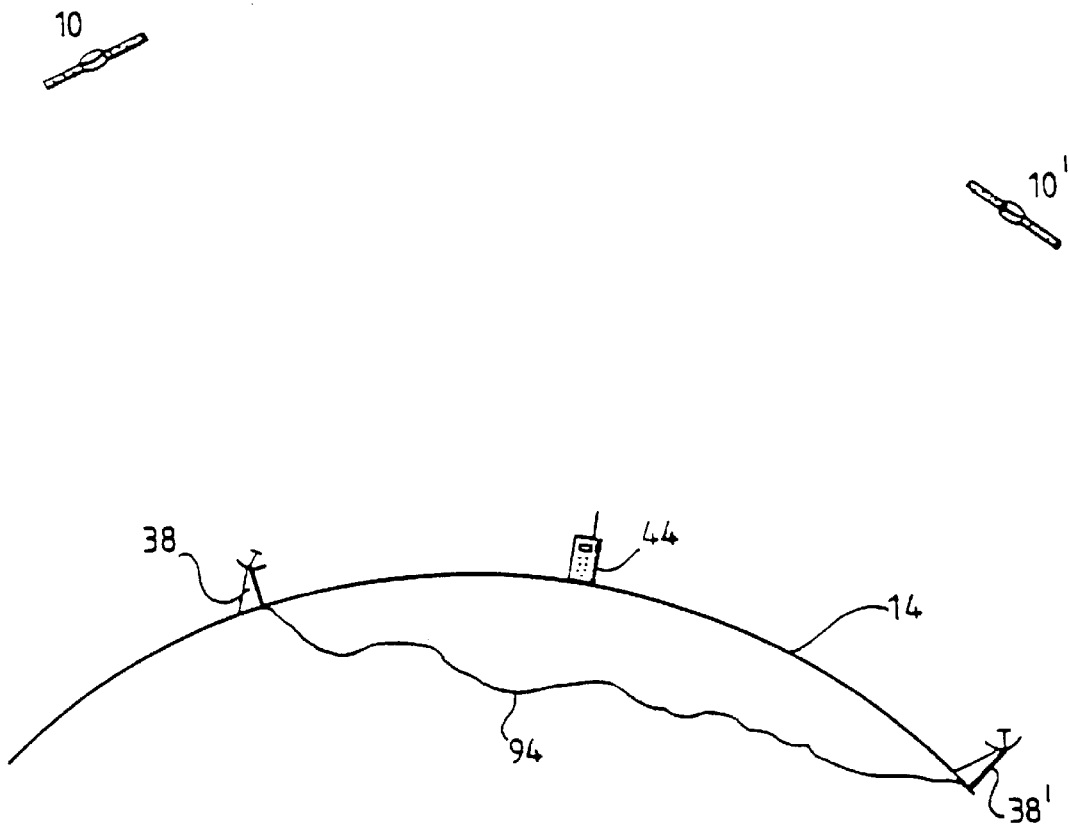
FIG. 14 shows the situation where the user terminal has direct access to more than one communications satellite.

FIG. 14 shows the situation where the user terminal 44, on the surface of the earth 14, has radio coverage from more than one communications satellite 10 10'. Ideally, the two communications satellites 10 10, should both be visible to the user terminal 44 and to a single earth station 38. However, it is possible that a communications satellite 10' may be visible of the user terminal 44 but not the single earth station 38. Alternatively, the other communications satellite 10' will be visible to another earth station 38'. This is not a problem since both earth stations 38 38' may be joined by a ground communication line 94 where data, derived from the communications satellite 10 10' and the user terminal may be exchanged for one of the earth stations 38 to act as a master in determining the position of the user terminal 44 on the surface of the earth 14.

If more than one communications satellite 10 10' is visible, or has been visible in the near past, instead of executing a doppler ranging operation as described with reference to FIGS. 7, 8, 9, 10, 11 and 12, a simple time delay measurement is executed as described with reference to FIGS. 6, 10, 11 and 13. An earth station 38 38' sends a signal to each of the communications satellites 10 10' and, as previously described, and measures the propagation delay between the communications satellite 10 10' and the user terminal 44.

As earlier described with reference to FIG. 6, the delay measurements generate, as the possible position of the user terminal 44 relative to the communications satellite 10, a spherical surface, centred on each of the communications satellites 10 10, which intersect with each other, and with the surface of the earth 14, to give a unique location for the user terminal 44 on the surface of the earth 14, subject to beam identity ambiguity resolution, hereinbefore described. If the user terminal is assumed to be on the surface of the earth, only two communications satellite propagation delays are necessary for absolute location of the user terminal. In more than 3 communications satellites 10 10' are so used, the user terminal 44 may be absolutely located in space, also allowing for altitude variations on the surface of the earth 14. It is to be noted, with reference to the description of FIG. 10, that the delay contours 82 are considerably more accurate, particularly at extreme range from the nadir 50 along the ground track as indicated by the horizontal lines of 78, than are the doppler contours 84. Accordingly, the method of measurement of the position of the user terminal 44 on the surface of the earth 14 describe with reference to FIG. 14 is more accurate.

Accordingly, the invention initially concerns itself with, in what manner, the position of the user terminal 44 is to be determined on the surface of the earth 14 using one or more communications satellites 10 10'. Where only one communications satellite 10 is visible, the ranging method shown in FIG. 10 is employed. When more than one communications satellite is visible, the position determined method described in relation to FIG. 14 is employed. These techniques are used, initially, to gain a rough estimation of the position of the user terminal 44.

Figure 15:
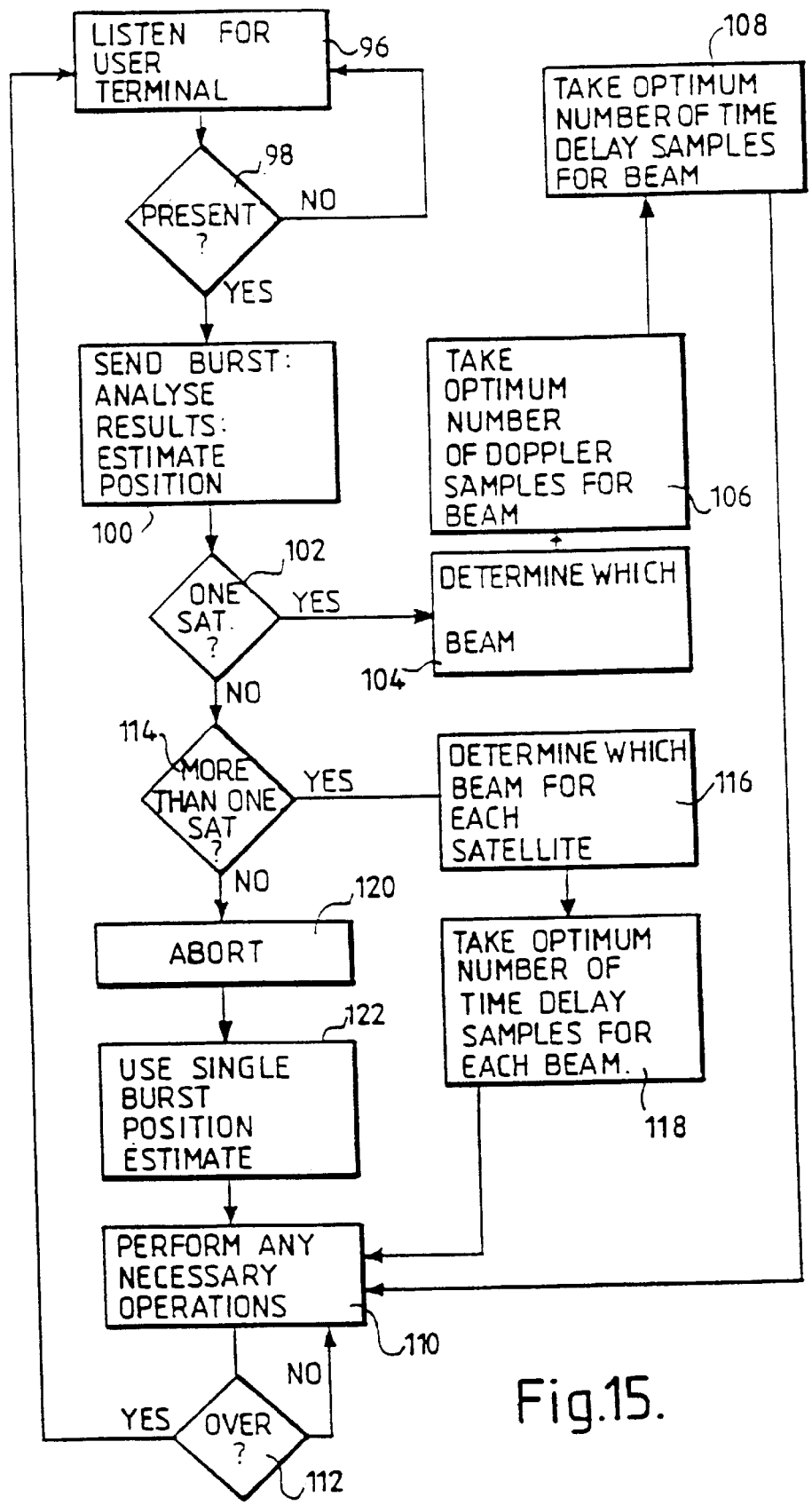
FIG. 15 is a flow chart of the activities of the earth station when determining the position of the user terminal on the surface of the earth employing one communications satellite, or more than one communications satellite, if available.

Attention is now drawn to FIG. 15 which shows the activity of the earth station controller 56 in that one of the earth stations 38 38' which executes the rough estimation position determination for the user terminal 44 using the communications satellite 10 10'.

In a first operation 96 the earth station 98 listens for a request of some kind of the user terminal 44. If a first test 98 fails to detect a call from the user terminal 44, control is passed back to the first operation 96. If the first test 98 determines that the earth station 38 has been polled by the user terminal 44, control is passed to a second operation 98. The second operation 98 sends a transmission, via the communications satellite 10, to the user terminal 44 as described with reference to FIG. 6, 9 and 10. It is to be presumed that the operation of FIG. 8, where the communications satellite is "calibrated", has already been executed. If the operation described with reference to FIG. 8 has not been executed, the second operation 100 executes the necessary calibration of the communications satellite 10.

The second operation 100 also analyses the results from the doppler frequency shift measurement and from the time delay measurement based on one mutual transmission between the earth station 38 and the user terminal 44 to give a guess as to the position of the user terminal 44 on the surface of the earth 44.

The earth station 38, having made an approximate estimate of the position of the user terminal 44, on the surface of the earth, is then in a position to determine whether or not the user terminal 44 will be visible to more than one communications satellite 10. If a second test 102 decides that only one communications satellite is visible, control passes to a third operation 104 which determines which one out of the plurality of spot beams 30 is occupied by the user terminal 44. This information may a so be known by the earth station 38 based on which of the spot beams 30 the signal from the user terminal 44 was received.

Control passes from the third operation 104 to a fourth operation 106 where, with reference to FIG. 12 on its associated description, depending upon which spot beam 30 is occupied by the user terminal 44, the optimum number of samples by message exchange is executed. This gives the greatest provision in position determination as described with reference to FIG. 11.

When the fourth operation 106 has performed its necessary function, control passes to a fifth operation 108 where delay measurements are made, as described with reference to FIG. 6, for the optimum number of samples for delay measurement as described with reference to FIGS. 11 and 14.

The fourth 106 and fifth operations 108 may be conducted simultaneously, the number of sampling instance being the larger or which ever is greater for doppler shift or delay measurement as shown as reference to FIGS. 12 and 13 for a particular spot beam 30, and the result being analysed for the lesser number only up to the smaller number required, later results being discarded.

The sum of the function of the fourth operation 106 and the fifth operation 108 is to give the best estimate, based on the style of position analysis described with reference to FIG. 10 where spheres of constant time delay and cones of constant doppler shift intersect the surface of the earth 14.

At termination of the fifth operation 108, control is passed to a sixth operation 110 where any necessary communications operation is executed. This may comprise a telephone call, a request for updating of position and status, or whatever else may be required. If a third test 112 depicts that the necessary operation of the sixth operation 110 is terminated, control returns to the first operation 96 where the earth station 38 once again listens for the user terminal 44 through the communications satellite 10.

Returning to the second test 102, it has been detected that there is just not a single communications satellite 10, control is passed to a fourth test 114 which determines if there is more than one communications satellite 10 10' present. If the fourth test 114 detects that there is a plurality of communications satellites 10 10' available, control passes to a seventh operation 116 where the earth station 38, via the earth station controller 56, determines for which of the plurality of spot beams 30 for each communications satellite the user terminal 44 is accessible. Thereafter, control passes to an eighth operation 118 where the earth station 38 exchanges the optimum number of radio bursts for each communications satellite 10 according to FIG. 6 and its associated description, and according to FIGS. 10 and 13 and their associated descriptions. Once the position of the user terminal 44 has been approximately determined by the eighth operation 118, control passes to the sixth operation 110 and thereafter as earlier described, back to the first operation 96.

If the fourth test 114 finds no communications satellites available, an unusual situation but none the less possible due to environmental blockage, control passes to a ninth operation 120 where the overall operation is aborted. Control then passes to a tenth operation where the earth station 38 assumes the rough position of the user terminal 44 based on the single burst doppler shift and delay measurements executed in the second operation 100.

After the tenth operation 122, control passes to the sixth operation 110 which performs any necessary operations, which, in this instance, might be for the earth station 38 to attempt to establish contact with the user terminal 44, or, perhaps, even to do nothing.

Control then passes back to the first operation 96.

Figure 16:
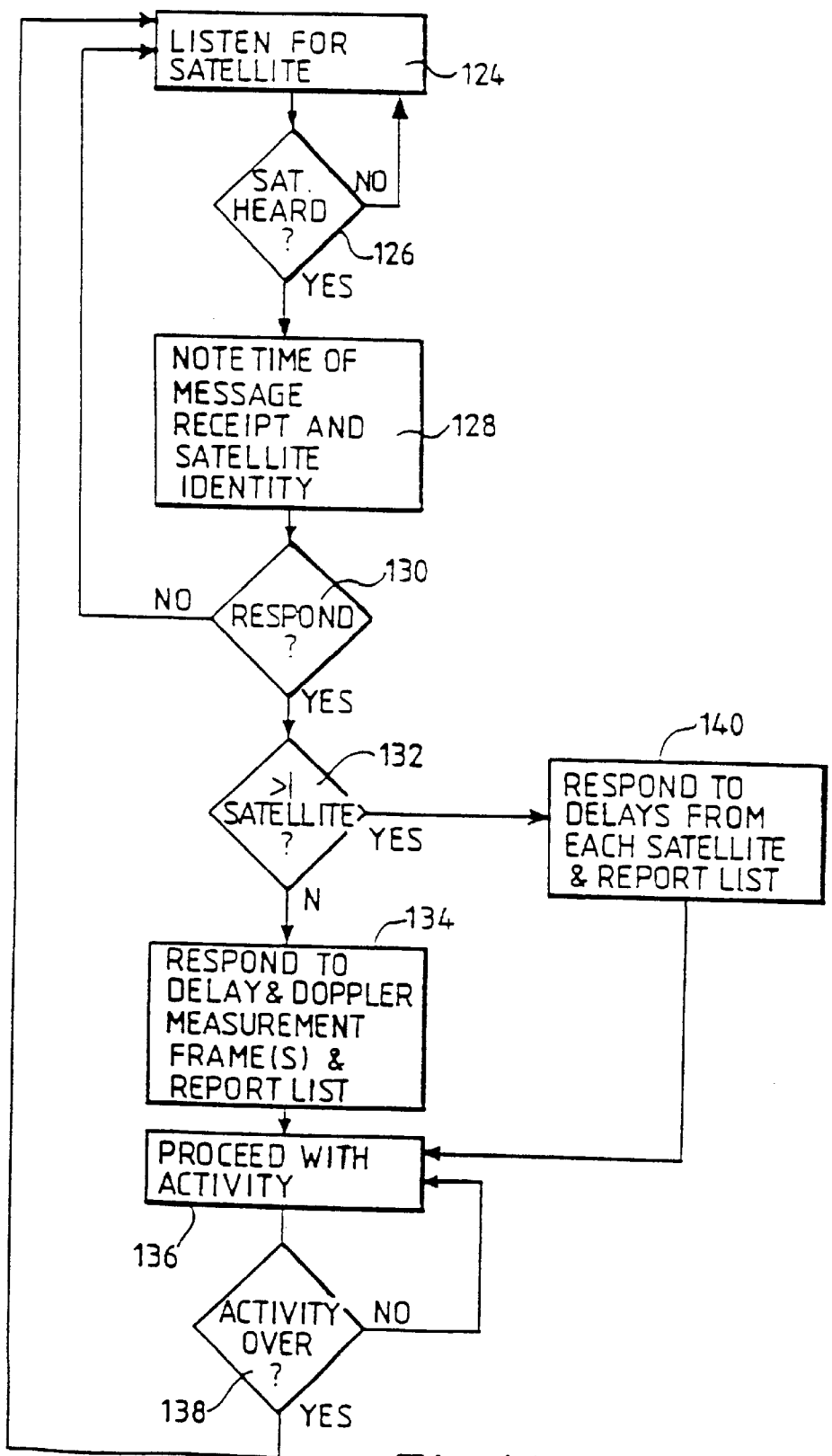
FIG. 16 is a flow chart showing how the earth station can incorporate timed broadcasts in determining the position of the user terminal on the surface of the earth.

FIG. 16 shows the activity of the user terminal 44 as it co-operates with the earth station 38 in yet a further alternative for locating the user terminal 44 in the surface of the earth 14.

The individual communications satellites 10, at periodical intervals, send out broadcast messages, on all of the spot beams 30, intended to be received by all user terminals 44. The broadcast message, from each communications satellite, originates originally, from an earth station 38 and contains information which identifies from which communications satellite the broadcast message is emanated. The time of transmission of the broadcast message is accurately known because, as described with reference to FIG. 6, the earth station 38 is aware of the precise distance between itself and the communications satellite 10. Equally, as shown in FIG. 14, different earth stations 38' can instruct different communications satellites 10' to provide a broadcast message. Each earth station 38' is aware of the position of the communications satellite 10 at all times and will also be aware of the identity of the earth station 38 38' from which the broadcast message originated. As an alternative, the broadcast message can also include indication from which earth station it originated.

In any event, it is merely necessary to note the time of arrival of a broadcast message at a user terminal 44, and to know from which communications satellite 10 it originated, in order, effectively, to do a ranging "propagation delay" measurement on the user terminal 44 from the communications satellite 10. Once again, a sphere of fixed delay, in terms of distance, describes the potential locus of the user terminal 44 about the central communications satellite 10, and the user terminal 44 can lie on the line of intersection of the sphere centred on the communications satellite 10, with the surface of the earth 14.

Returning once again to FIG. 16, the user terminal, in an 11th operation 124, listens for the broadcast messages from the communications satellites 10 until a fifth test 126 detects that a communications satellite has been heard. Control then passes to a 12th operation 128 where the user terminal, using an internal clock, notes and stores the instant of receipt of the message from the communications satellite 10 together with the identity of the particular communications satellite 10 from which the message originated. The user terminal 44 keeps a record of the last several communications satellites 10 to be heard.

Control then passes to a sixth test 130 which checks to see if the user terminal 44 is required to respond to the communications satellite 10. If no response is required, control passes back to the 11th operation 124 where the user terminal once again listens for broadcast messages from the communications satellite 10.

If the sixth test 130 determines that the user terminal 44 is required to respond in some manner, perhaps for communications or registration purposes, control passes to a seventh test 132 which checks to see if only one communications satellite 10 is visible, or more than one communications satellite 10 is visible. This can be established from the list compiled in the 12th operation 128.

If the seventh test 132 detects that there is only one communications satellite visible, control passes to a thirteenth operation 134 where the user terminal 44 responds to delay and doppler measurements as indicated with reference to FIGS. 6 to 13. The user terminal 44 also sends, to the earth station 38 the list of times and identities of heard communications satellites 10 which was accumulated by the 12th operation 128.

The earth station controller 56 then combines all of these measurements and will know the position of the user terminal 44 on the surface of the earth 14. Control next passes to a fourteenth operation 136 where the user terminal 44 proceeds with whatever activity is required or it, which, as will later be described, can include message receipt from one or more of a plurality of positioning satellites, and establishement and execution of phone calls, until an eighth test 138 detects that the activity is over and passes control back to the eleventh operation 124 where the user terminal 44 listens for messages from the communications satellites 10.

If the seventh test 132 detects that more than one communications satellite present, control passes to a fifteenth activity 140 where the user terminal 44 responds to a propagation delay measurement from each of the communications satellites 10 10' as described with reference to FIGS. 14 and 15. The user terminal 44 also reports, to the earth station 38, the contents of the list accumulated in the twelfth operation 128 during the time of receipt and identity of communications satellite broadcast messages.

At this point, the earth station 38 with which the user terminal 44 is interactive will have sufficient information to determine the position of the user terminal 44 along the surface of the earth 14.

The fifteenth activity 140 having being completed, control passes to the fourteenth activity 136 which proceeds with whatever activity the user terminal is required to perform and then, via the eighth test 138, returns control to the eleventh operation 124 where the user terminal 44 continues to listen to broadcast messages from communications satellites 10.

It is to be noted that, if there are sufficient readings listed by the twelfth operation 128 and the user terminal 44 has not been moving any significant distance over time, then the position of the user terminal 44 on the surface of the earth 14, may adequately and accurately be measured simply on the basis of the record accumulated by the twelfth operation 128 thus dispensing with the necessity in the fifteenth activity 140 to measure delays from each visible communications satellite or, in the thirteen activity 134 to perform a doppler measurement together with a delay measurement.

Equally, in the thirteenth activity 134, if the combined propagation delay and Doppler frequency shift measurement produces a location which roughly corresponds to the location resulting from intersection of the spheres of constant delay as determined from the list of broadcast receipt times and communications satellite identities as collected by the twelfth operation 128, and this latter determination is more accurate, then the earth station 38, through its earth station controller 56, can opt to use the latter determination.

Another extremely significant element of the compilation of the list by the twelfth operation 128 and its being reported by the thirteenth operation 134 and the fifteenth activity 140 is very simply that the position of the user terminal 44 on the surface of the earth, can be measured using communications satellites 10 which are no longer visible to the user terminal 44. This is in contrast to all other methods which require that a communications satellite 10, used for a position determination, should be visible to the user terminal 44.

The user terminal 44 comprises an internal clock. This clock, of course, has relative inaccuracies. The earth station 38, in combination with the earth station controller 56, possess a very accurate clock. In order for the earth station 38 properly to use the list gathered by the 12th operation 128, it is necessary to correct the errors in the clock on the user terminal. This is very simply done. The earth station 38, at a first known instant, requests the user terminal 44 to indicate the time, on its clock to the earth station 38. The earth station 38 knows the propagation delay between itself and the user terminal 44. The time of response, by the user terminal 44, is thus very accurately known. Having noted what time the user terminal clock believes it to be, the earth station 38 and the earth station controller 56 wait for a predetermined period, perhaps one second, and request that the user terminal 44 once again tells the earth station 38 what time the user terminal thinks it is. The earth station 38 thus has two readings from which the rate of drift of the clock on the user terminal 44 and the accumulated timing error can be determined. The earth station 38, with the earth station controller 56, can thus extrapolate using the known drifts and errors, the times recorded in the list generated by the twelfth operation 128. The corrected times are then compared with the known times of transmission from each communications satellite 10 of the particular broadcast messages. The earth station controller 56 can then calculate the propagation delay between each communications satellite and the user terminal. Since the position of each communications satellite is accurately known, it is possible to determine the range of the user terminal 44 from the particular communications satellite which did the broadcasting.

The previously described measures can be used singly, multiply or in any combination to determine the approximate location of the user terminal 44 on the surface of the earth 14. If two communications satellites are visible, the present invention also includes the possibility of using a doppler frequency shift measurement from each of the communications satellites to determine the position of the user terminal 44.

Thus far, the description of the invention has been restricted to the initial phase where the communications satellite 10 or satellites 10 10' have been used to make an estimate of the position of the user terminal 44. The following description now passes the the manner in which information, received by the user terminal 44 from one or more of a plurality of positioning satellites, is used signigicantly to enhance the accuracy of the determination of the position of the user terminal 44 on the surface of the earth 14.

To this point, the description of the invention has been limited to that element thereof which employs communication satellites for the purpose of measuring the position of the user terminal 44 on the surface of the earth 14. The following description relates to that element of the invention which incorporates other delay measurements to obtain, under no matter what circumstances, the best estimate of the position of the user terminal 44 on the surface of the earth 14.

Figure 17:
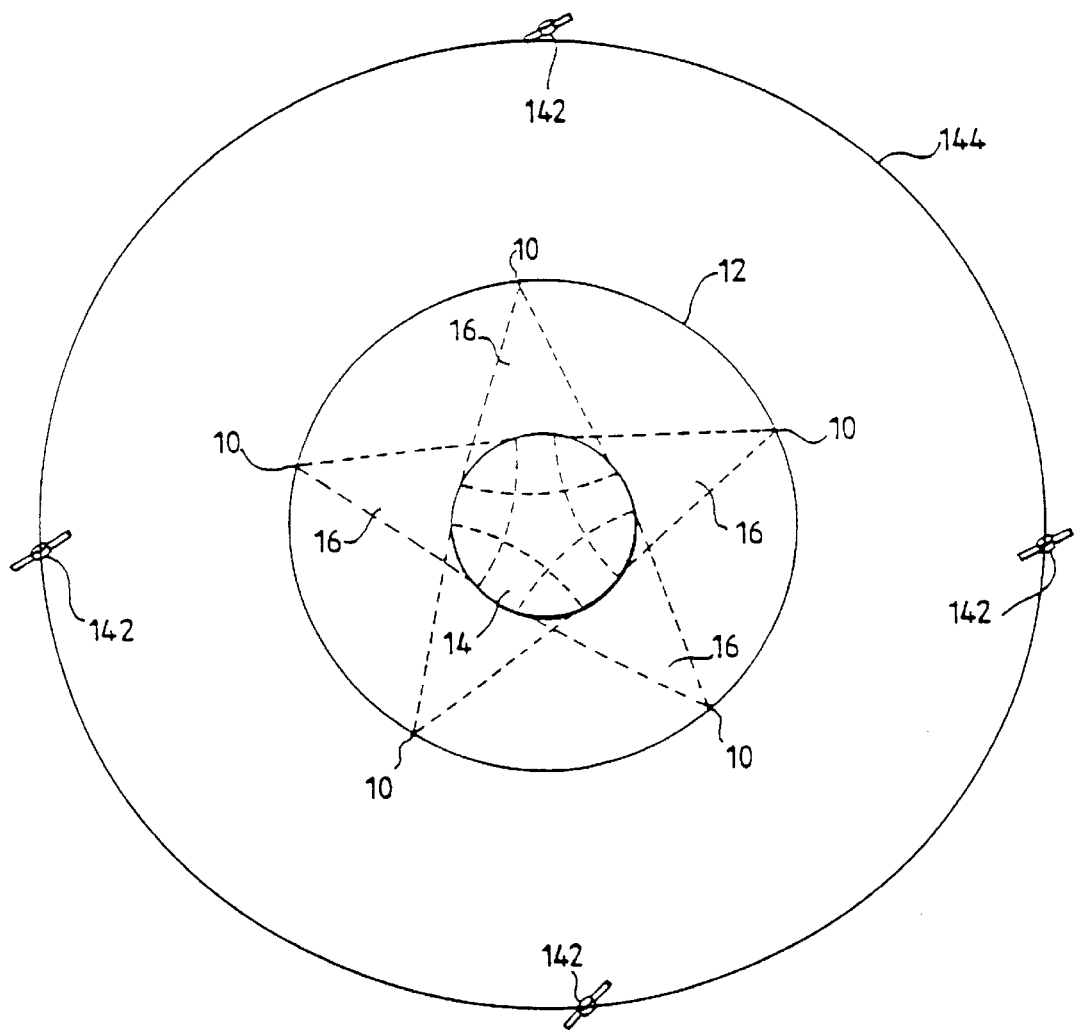
FIG. 17 is an expansion of FIG. 1 wherein the communications satellites are shown in their relationship to navigational or positioning satellites.

FIG. 17 is an expansion upon FIG. 1. Communications satellites 10 are disposed in an orbit 12 about the earth 14 giving cones 16 a radio coverage. Members of an extra constellation of positioning satellites 142 are disposed of in another orbit 144 about the earth 14.

The positioning satellites 142, chosen to illustrate this element of the present invention, are selected to be those employed in the global positioning system (GPS) provided by Navstar and as described in their service and signal specification published, in its second edition, on Jun. 2, 1995. In this system, the constellation comprises 24 positioning satellites 142 disposed in six orbits 144, around the earth 14, there being 4 satellites 142 in each orbit 144 and each of the orbits 144 being inclined to the equator at an angle of 55 degrees.

As will come apparent from the following description, this particular system is just one example of the manner in which the present invention can be implemented. All that is required to practise the present invention is a source 142 in a known position is capable of making a transmission at a known time.

The another orbit 144 given in this example, is at approximately 20 thousand kilometers from the surface of the earth 14 and allows the positioning satellites 142 to circle the earth in 12 hours. Again, it will be apparent that positioning satellites 142 may be employed in orbits of any height for the present invention to function.

Figure 18:
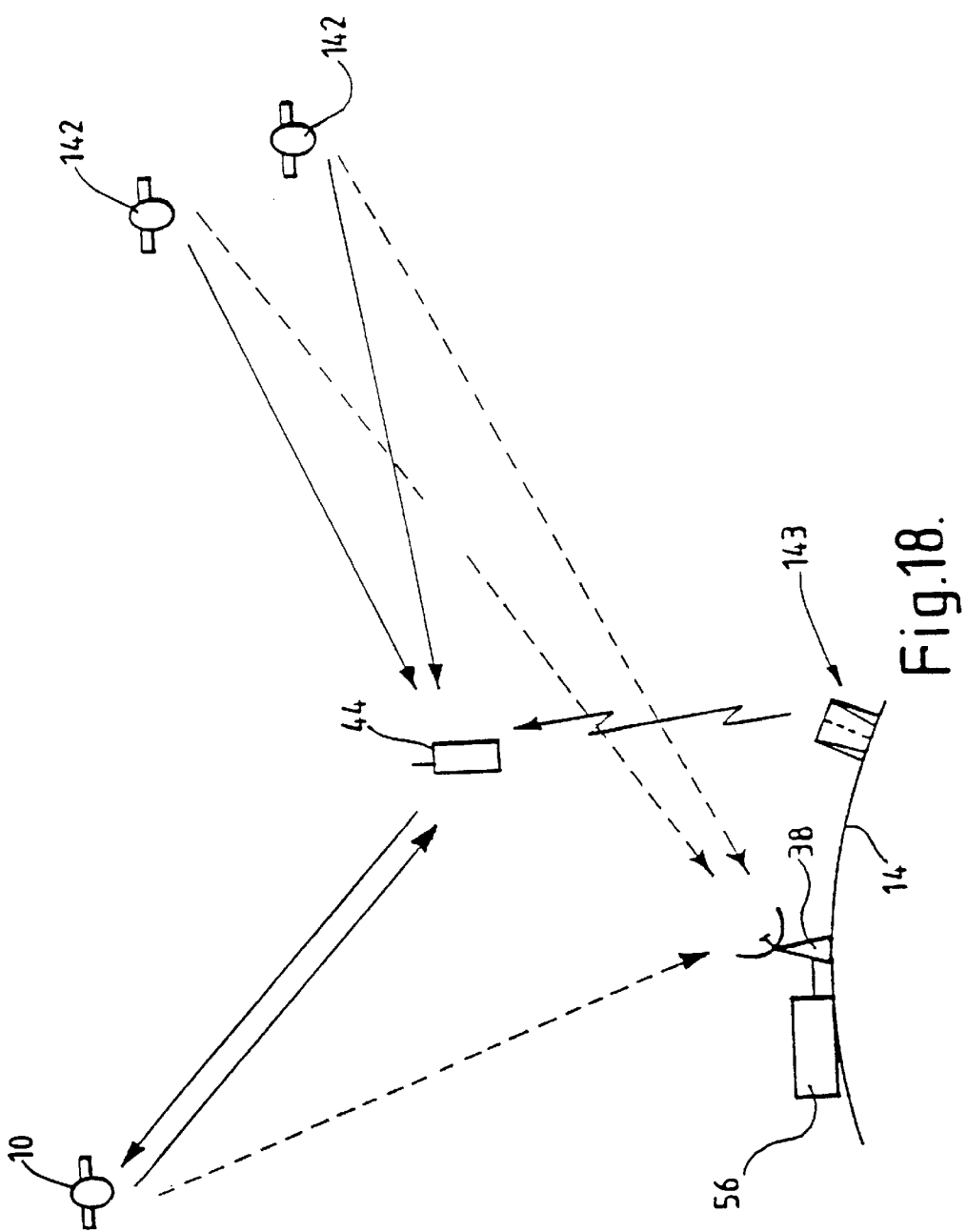
FIG. 18 is a schematic diagram showing the total environment of the present invention.

FIG. 18 is a schematic diagram illustrating the environment in which the present invention is practised.

The user terminal 44 is in contact with one or more communication satellites 10 which, in turn, are in contact with the earth station 38 and its associated earth station controller 56. The interactions, therebetween, have already been described.

In addition, the user terminal 44 is operative to receive transmissions from positioning satellites 142. The user terminal 44 is operative to relay information concerning transmissions from the positioning satellites 142 to the earth station 38 and its associated control of 56. The earth station 38 is also aware of the orbital positions and behaviour of the positioning satellites 142 either by direct transmission or by prior knowledge of the system of the positioning satellites 142 in their constellation.

While two positioning satellites 142 have been shown in FIG. 18, it is to be understood that the user terminal 44 may, at any instant, be unable to see any positioning satellites 142, just one positioning satellite 142, or many positioning satellites 142 at the same time. The situation shown in FIG. 18 is not restrictive.

As a variation on the theme of receiving a signal from a known source in a known position, transmitted at a known time, the user terminal 44 can, in place of the positioning satellites 142, instead employ a fixed service radio station 143, at a known position on the surface of the earth. Such stations provide a low frequency signal giving the time of the transmission and are used, among other applications, for running self-adjusting clocks. The low frequency signal, typically in the range 10 khz to 100 khz, is ducted across the surface of the earth 14 rather than reflected from the ionised layers of the atmosphere. Because of this, the propagation speed of the low frequency radio wave is known and the distance from the fixed radio station 143 can be measured by measuring the delay in receipt of its time signal.

Again, as a variation on the positioning satellites 142, in the embodiment of the invention the GPS satellites 142 can be replaced by any other navigational satellites. In particular, there is an alternative navigational satellite system, provided by the former USSR (now the Russian federation), which can be used in exactly the same manner as hereinafter described. All that is required is simply that the satellites 142 have known orbits and transmit signals, to be picked up by the user terminal, at a known or determinable time.

As a further variation on the theme of the positioning satellites 142, it is not even necessary that the positioning satellites 142 be navigational satellites. Other satellite communications systems do and will exist. Each communications system has satellites whose orbital parameters which can be known or measured by the earth station 38 56. Satellite communications systems periodically poll or interrogate user terminals or other equipment on the ground 14. It is simply necessary for the user terminal 44 of the present invention to detect a polling signal or other transmission from an alternative satellite communications system, and for the earth station 38 56 to know the time of the transmission and the position of the source, for the present invention to be practised using signals from an alternative satellite communications system. Such alternative satellites are characterised by being in a different constellation from the communications satellites 10 10' of the present invention, which definition covers all forms of satellites 142 which can be used by the present invention.

All of the sources 142 143 of positioning signals hereinbefore and hereinafter described are autonomous. That is to say, the time and nature of the signal they send is not under any form of control from the earth station 38 56 or the user terminal. This is in contrast to the signals exchanged between the user terminal 44 and the earth station 38 via the communications satellite 10.

For the purpose of clarity, an autonomous source of signals is hereinbefore and hereinafter defined as a source of signals whose signal content and time of sending signals is not under any control from either the user terminal or the earth station.

Figure 19:
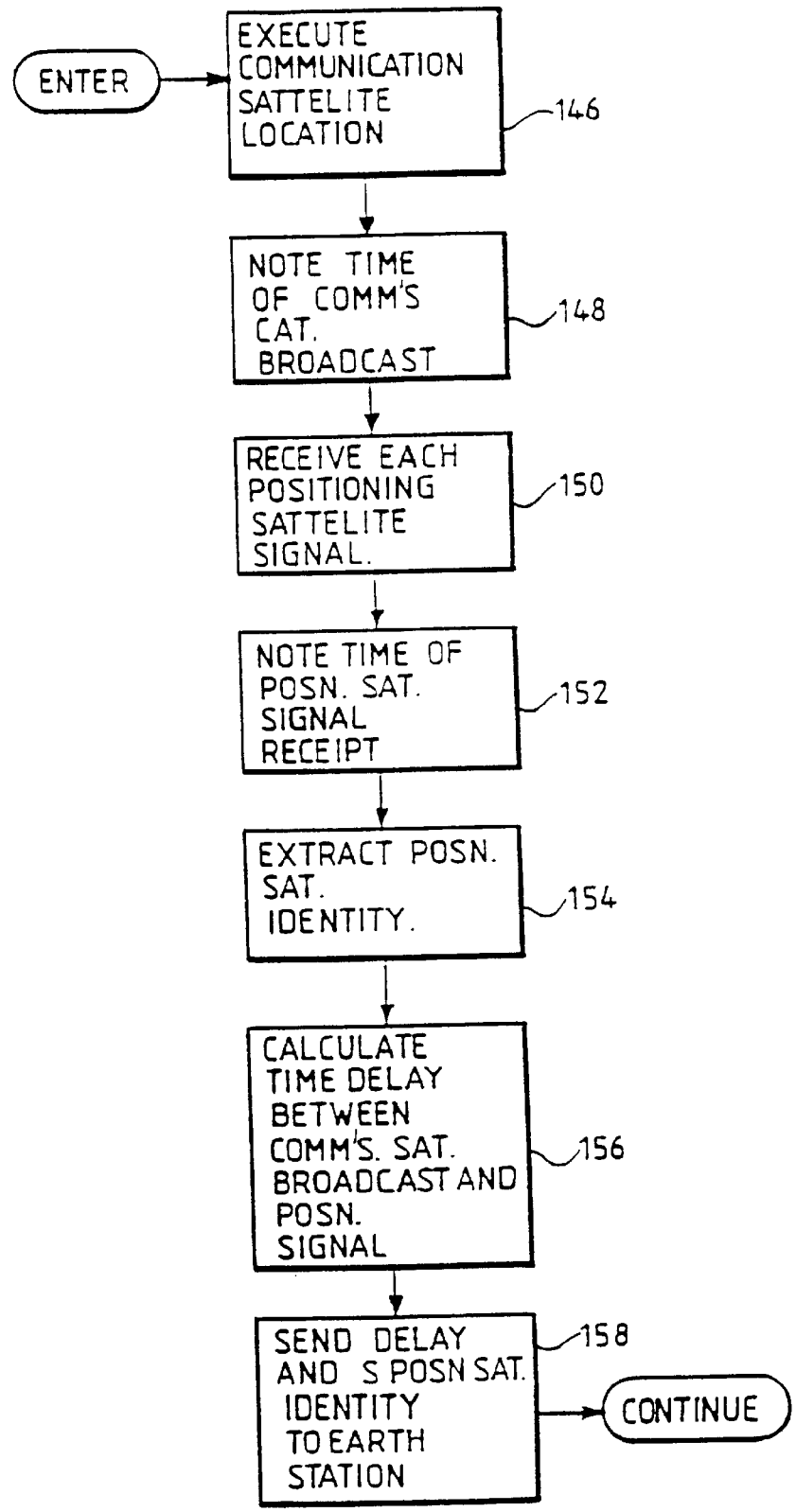
FIG. 19 is a flow chart of the cativities of the user terminal in the overall scheme of the present invention.

FIG. 19 shows a flow chart of the activity of the user terminal 44 within the scope of the present invention.

Entry is to a sixteenth activity 146 which corresponds to the activities otherwise shown in the flow charts of FIGS. 15 and 16. In this manner, an approximate estimation is made of the position of the user terminal 44 on the surface of the earth. If there is only one communication satellite 10 visible to the user terminal 44, the combination of a delay measurement and a Doppler shift measurement are used to estimate the position of the user terminal 44. If more than one communication satellite 10 is available, a combination of propagation delays between the user terminal 44 and the communications satellite 10 is used.

The user terminal, as described in FIG. 19, cooperates with the earth station 38 and its associated controller 56 to achieve the measurements hereinbefore described.

Having estimated the position the user terminal 44, on the surface of the earth 14, control passes to a seventeenth activity 148 where the user terminal 44, listening to the communications satellite 10, notes the time that a broadcast transmission is received from the earth station 38. It is to be understood that, under normal circumstances, the clock, within the user terminal, is well below any standard of accuracy necessary to make any meaningful measurement with positioning satellites 142. However, the present invention provides that even a poor quality clock in the user terminal 44 may be used in combination with signals from positioning satellites 142 achieve realistic results when interacting with positioning satellites 142.

The seventeenth activity 148, by noting the time of receipt of the broadcast from the earth station 138, makes a bench mark for further measurements.

Control then passes to an eighteenth activity 150 where the user terminal 44 listens for signals from any positioning satellite 142 which may be within range. As earlier stated, perhaps no positioning satellite 142 is within range. Alternatively, perhaps many positioning satellites 142 can be heard.

Control passes to a nineteenth activity 152 where, in the event of the user terminal 44 hearing a signal from a positioning satellite 142, the user terminal using its own internal clock, notes the time at which the signal from the positioning satellite 142 was received.

Control then passes to a twentieth activity 154 where the user terminal 44 extracts the very minimum information from the signal from the positioning satellite 142, namely the identity of the particular positioning satellite of 142 of which the satellite was received Control then passes to a twenty-first activity 156 where the user terminal 44 calculates the elapsed time, otherwise the time delay, between receipt of the communications satellite broadcast, executed in the seventeenth activity 148 and the noted time of receipt of the signal from the positioning satellite 142. Although the clock in the user terminal is inherently of poor regulation, because differences are merely a secondary effect, the error in measuring the time delay in the receipt of the broadcast in the seventeenth activity 148 and the time of positioning satellites 142 signal receipt in the nineteenth activity 152 is very small. These are simply second order effects. By starting a timing operation on receipt of the broadcast message from the earth station 38, and by ending the timing operation when the signal from the positioning satellite 142 is received, and noting the elapsed time between the two events, the user terminal 44 creates a record which is meaningful to the earth station 38 and its controller 56 and which the earth station 38 56 can use, together with the knowledge of the propagation delay, via the communications satellite 10, between the user terminal 44 and the earth station 38, and, at the earth station 38, an accurate knowledge of the real time, to determine, with considerable accuracy, the instant at which the signal, from the positioning satellite 142, arrived at the user terminal 44.

Control then passes to a twenty-second activity 158 where the user terminal 44 sends, via the communication satellite 10, to the earth station 38 and its associated control of 56, the identity of the particular positioning satellite 142 from which a signal was received together with the measured elapsed time delay for that positioning satellite 142 which the user terminal has identified.

Figure 20:
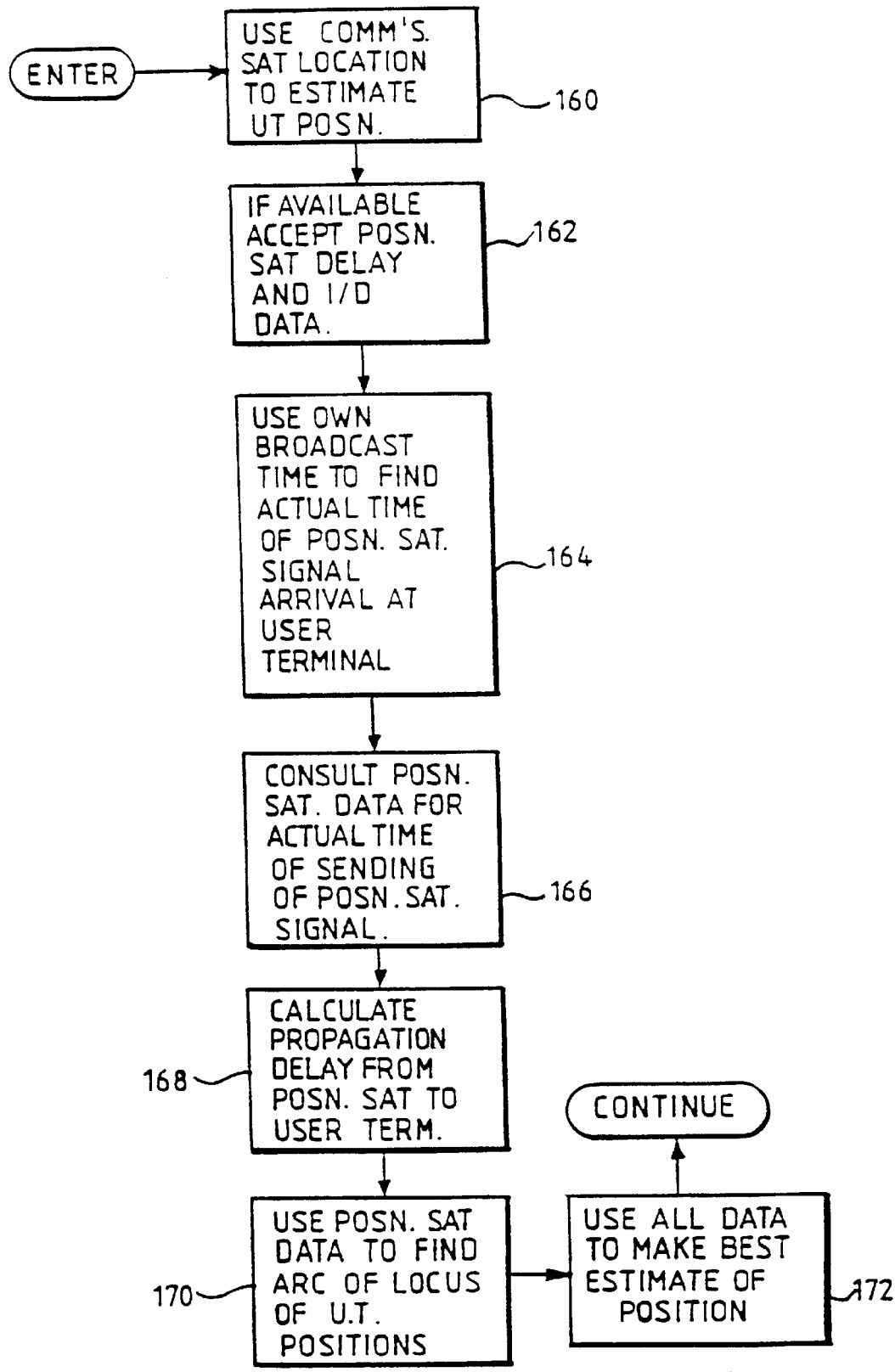
FIG. 20 is a flow chart of the overall activity of the earth station in relation to FIG. 19.

FIG. 20 is a flow chart of the activity of the earth station 38 and its associated controller 56 in response to the various activities of the user terminal 44 shown in FIG. 19.

Entry is to a twenty-third activity 160 where the earth station 38 co-operates, as otherwise illustrated with reference to FIGS. 15 and 16, to establish, using the communications satellite 10 alone, an approximate estimation of the position of the user terminal 44 on the surface of the earth 14.

Having thus approximately established the position of the user terminal 44 on the surface of the earth, control passes to a twenty-fourth activity 162 where the earth station 38 and its associated controller 56 receive, if they are available, any messages from the user terminal 44 indicating the identity of any positioning satellite 142 which may have sent a signal to the user terminal 144 and the delay between the receipt, by the user terminal 44, of the broadcast from the earth station 38 and the time when the user terminal 44 receives the signal from the positioning satellite 142. If no positioning satellite 142 was ever visible to the user terminal 44, then, of course, the twenty-fourth activity 162 has nothing to do. However, the twenty-fourth activity 162 will note the delays and identities any and all of the positioning satellites 142 from which the user terminal 44 may have received signals.

Control then passes to a twenty-fifth activity 164 where the earth station 38 and its associated control of 56 calculate the actual time of arrival of the signal from each audible position satellite 142 at the user terminal 44.

As earlier described, the earth station 38, using its own very accurate clock, is aware of the instant at which it sent the broadcast, via the communications satellite and, to the user terminal 44. Again, as earlier described, the earth station 38 and its associated control of 56 have already measured the propagation delay between the earth station 38 and the user terminal 44 via the satellite 10. The instant of arrival of the broadcast message, from the earth station 38, at the user terminal 44, is thus accurately known at the earth station 38. The earth station 38 and the associated control of 56 merely have to add the measured delay by the user terminal 44 to the calculated actual instant of arrival of the broadcast from the earth station 38 in order to establish the exact instant when the signal from a positioning satellite 142 reached the user terminal 44.

Having made the calculation for each signal from a positioning satellite 142, control passes to a twenty-sixth activity 166. The earth station 38 and its associated controller 56 have available the parameters of the constellation of the positioning satellite 142. This includes information concerning the exact position of each positioning satellite 142 at any instant, and the instance at which a particular positioning satellite 142 will have sent its signal. This is derived either from an internal reference in the control of 56, by active on-line information from a control centre for the positioning satellites 142, or, as shown in FIG. 18, by interpreting signals from the positioning satellites 142 by direct reception. That is to say, the earth station 38 and its controller 56 can directly interact with the positioning satellites 142 to monitor their positions and times of sending of any signals, for comparison with the results from the user terminal 44. It does not matter in which manner this information was obtained. It is simply sufficient that the information is available.

Having determined, from the identity of each satellite, the necessary physical parameters for the constellation of positioning satellites 142, control passes to a twenty-seventh activity 168 where the propagation delay from each position satellite 142 to the user terminal 44 is calculated. Thereafter a twenty-eighth activity 170 uses knowledge of the actual positions of the positioning satellites 142 at the instant of their sending their original signals to the user terminals 44, and of the calculated propagation delay between each one and the user terminal 44, to calculate the loci and their intersections whereat the user terminal 44 can be situated.

Control then passes to a twenty-ninth activity 172 where a best estimate of the position of the user terminal 44 on the surface of the earth 14 is made based on the available measurements. For example, if only one communication satellite 10 was visible and no positioning satellites 142, the combination of Doppler shift measurement and propagation delay measurement to the user terminal 44 for a single communications satellite is accepted, but with a very low confidence level. If two communications satellite's 10 10' were visible, but no positioning satellites 142, the combination of delay measurements is used to estimate the position of the user terminal 44 on the surface of the earth 14 but with a low confidence level. If either two communications satellite 10 and one positioning satellite 142 were simultaneously accessible, or only one communication satellite 10 and one positioning satellite 142 were simultaneously visible, the estimated position of the user terminal 144 on the surface of the earth 14, as calculated, is given a medium confidence level.

If two or more positioning satellites 142 were accessible, either their position estimations of the user terminal 44 on the surface of the earth 14 are taken with more weighting, and reducing the weighting of the position estimations from the communications satellite or satellites 10 and their positional information, with a high degree of confidence or both the communications satellite 10 and the positioning satellites 142 are considered to achieve the final result with a high degree of confidence.

While FIGS. 19 and 20 show various activities occurring in sequence, it is to be appreciated that information, regarding the position satellites 142, can be gathered before, during and after execution of the sixteenth activity 146 and the twenty-third activity 160. Equally, further information from as yet unheard positioning satellites 142 can be added at any time to improve the position estimation for the user terminal 44. Likewise, the user terminal 44 can store results, gained from receiving signals from positioning satellites 142 before the earth station 38 interrogated the user terminal 44 for service, thereby making for a very rapid and accurate determination of positions.

The user terminal 44, in the example of the present invention here given, must be capable of receiving signals from positioning satellites 142 and from the communication satellites 10 even if they are on different frequencies. In the example given, the positioning satellites 142 send their signals on approximately 1600 MHz, as against the interaction frequencies with the communications satellite 10 at around 2000 MHz. If the present invention is practised using signals from an alternative constellation of communications satellites (such as those from another service provider), it is possible for the signals all to be at or near 2000 MHz. If a fixed terrestrial time source such as the low frequency radio station 143 is used, an LF receiver must be incorporated in the user terminal 44.

In the example given above, the estimation of the position of the user terminal 44 has been made employing just one delay measurement from each positioning satellite 142. It is to be appreciated that the present invention also encompasses the position of the user terminal 44 being estimated on the basis of plural measurements from each positioning satellite 142.

Further, in the event that the source 142 143 of the signals also provides indication of the instant at which it sent the signal, which was received by the user terminal 44, was sent by the source 142 143, the present invention also encompasses the user terminal 44 detecting the indication of the instant of transmission and passing on that indication to the earth station 38 56 for use thereby. Such information is of greatest utility when the source is the terrestrial radio station 143, whose position is always fixed and whose regular transmissions merely need a time stamp.

As an additional feature, in the event that the earth station 38 56 can establish the position of the user terminal with a high degree of certainty, the earth station 38 56 can pass an indication of the measured position of the user terminal 44, to the user terminal 44, using either a message to be displayed by the user terminal 44 or by a synthesised audio message, so that the user terminal 44 becomes useable as a position location device despite not having the inherent capacity so to do.

We claim:

1. A satellite communications system where an earth station is operative to exchange messages with a user terminal through a communications satellite in movement relative thereto, and to exchange messages with said communications satellite, to measure the position of the user terminal , said system being characterised by: said user terminal being operative to receive a signal, sent from a known position at a known time from a known autonomous source; said user terminal being operative to note the time of arrival of said signal; said user terminal being operative to communicate said time of arrival to said earth station via said communications satellite; said earth station being operative to calculate the distance between said autonomous source and said user terminal; and said earth station being operative to incorporate said calculated distance in the estimation of said position of said user terminal, otherwise derived by said exchanging messages between said earth station and said user terminal via said communications satellite.

2. A system, according to claim 1, wherein said autonomous source, in said signal, is operative to provide indication of its identity, wherein said user terminal is operative to detect said identity, and wherein said user terminal is operative to convey, to said earth station, indication of said identity.

3. A system, according to claim 1, wherein said autonomous source is operative, in said signal, to provide indication of the time of origin of said signal from said autonomous source, and wherein said user terminal is operative to convey, to said earth station, indication of said time of origin of said signal from said autonomous source.

4. A system, according to claim 1, wherein said autonomous source is a satellite in a constellation other than that occupied by said communications satellite.

5. A system, according to claim 4, wherein said autonomous source is a navigational satellite.

6. A system, according to claim 1, wherein said autonomous source is a terrestrial, low frequency time station.

7. A system, according to claim 5 wherein said navigational satellite is one of a constellation comprising a plurality of navigational satellites.

8. A system, according to claim 7, wherein said user terminal is operative to respond to any of said plurality of navigational satellites from which a signal can be received and wherein said earth station is operative to respond to information, received from said user terminal, concerning any of said plurality of navigational satellites from which a signal can be received by said user terminal.

9. A system, according to claim 8, wherein said earth station, on the basis of said measurement of said position of said user terminal by said exchange of messages between said earth station and said user terminal via said communications satellite, is operative to indicate, to said user terminal, those out of said plurality of navigational satellites which are potentially within range of sending a signal to said user terminal, and wherein said user terminal is responsive thereto to restrict potential reception of signals to signals originating from those navigational satellites, indicated by said earth station.

10. A system, according to claim 9, wherein said indication of those out of said plurality of navigational satellites which are potentially within range of sending a signal to said user terminal are broadcast, by said communications satellite, to all of a plurality of user terminals within communications range of said communications satellite.

11. A system, according to claim 1, wherein said user terminal is operative to commence a timing operation on receipt of a message from said earth station, wherein said user terminal is operative to terminate said timing operation on receipt of a signal from said autonomous source, wherein said user terminal is operative to employ the measured, elapsed time of said timing operation as said time of arrival of said signal at said user terminal, and wherein said earth station is operative to use the propagation delay between said earth station and said user terminal to deduce the true time of arrival of said signal at said user terminal.

12. A method for operating a satellite communications system where an earth station is operative to exchange messages with a user terminal through a communications satellite in movement relative thereto, and to exchange messages with said communications satellite, to measure the position of the user terminal, said method including the steps of: said user terminal receiving a signal, sent from a known position at a known time from a known autonomous source; said user terminal noting the time of arrival of said signal; said user terminal communicating said time of arrival to said earth station via said communications satellite; said earth station calculating the distance between said autonomous source and said user terminal; and said earth station incorporating said calculated distance in the estimation of said position of said user terminal, otherwise derived by said exchange of messages between said earth station and said user terminal via said communications satellite.

13. A method, according to claim 12, wherein said autonomous source, in said signal, is operative to provide indication of its identity, said method including the steps of said user terminal detecting said identity, and said user terminal conveying, to said earth station, indication of said identity.

14. A method, according to claim 12, wherein said autonomous source is operative, in said signal, to provide indication of the time of origin of said signal from said autonomous source, and wherein said method includes the step of said user terminal conveying, to said earth station, indication of said time of origin of said signal from said autonomous source.

15. A method, according to claim 12, wherein said autonomous source is a satellite in a constellation other than that occupied by said communications satellite.

16. A method, according to claim 15, wherein said autonomous source is a navigational satellite.

17. A method, according to claim 12, wherein said autonomous source is a terrestrial, low frequency time station.

18. A method, according to claim 16 wherein said navigational satellite is one of a constellation comprising a plurality of navigational satellites.

19. A method, according to claim 18, including the steps of said user terminal responding to any of said plurality of navigational satellites from which a signal can be received and said earth station is responding to information, received from said user terminal, concerning any of said plurality of navigational satellites from which a signal can be received by said user terminal.

20. A method, according to claim 19, including the steps of said earth station indicating, on the basis of said measurement of said position of said user terminal by said exchange of messages between said earth station and said user terminal via said communications satellite, to said user terminal, those out of said plurality of navigational satellites which are potentially within range of sending a signal to said user terminal, and said user terminal responding thereto to restrict potential reception of signals to signals originating from those navigational satellites, indicated by said earth station.

21. A method, according to claim 20, including the step of said communications satellite broadcasting said indication of those out of said plurality of navigational satellites which are potentially within range of sending a signal to said user terminal to all of a plurality of user terminals within communications range of said communications satellite.

22. A method, according to claim 12, wherein said noting of said time of arrival of said signal includes the steps of said user terminal commencing a timing operation on receipt of a message from said earth station, said user terminal terminating said timing operation on receipt of a signal from said autonomous source, said user terminal employing the measured, elapsed time of said timing operation as said time of arrival of said signal at said user terminal, and said earth station using the propagation delay between said earth station and said user terminal, via said communications satellite, to deduce the true time of arrival of said signal at said user terminal.

23. A system, according to claim 1, wherein said user terminal is operative to respond to plural signals from said autonomous source and wherein said earth station is operative to incorporate each instance of receipt of a signal from said autonomous source into said estimation of said position of said user terminal.

24. A system, according to claim 7, wherein said user terminal is operative to respond to plural signals from each of said plurality of navigational satellites and wherein said earth station is operative to incorporate each instance of receipt of a signal from each of said plurality of navigational satellites into said estimation of said position of said user terminal.

25. A method, according to claim 12, including the steps of said user terminal responding to plural signals from said autonomous source and said earth station incorporating each instance of receipt of a signal from said autonomous source into said estimation of said position of said user terminal.

26. A method, according to claim 18, including the steps of said user terminal responding to plural signals from each of said plurality of navigational satellites and said earth station incorporating each instance of receipt of a signal from each of said plurality of navigational satellites into said estimation of said position of said user terminal.

27. A user terminal for a satellite communications system in which an earth station is operative to exchange messages with the user terminal through a communications satellite in movement relative thereto, and to exchange messages with said communications satellite, in order to measure the position of the user terminal, said user terminal being operative to receive a signal, sent from a known position at a known time from a known autonomous source;

said user terminal being operative to note the time of arrival of said signal; and said user terminal being operative to communicate said time of arrival to said earth station via said communications satellite;

whereby to permit said earth station to calculate the distance between said autonomous source and said user terminal; and to incorporate said calculated distance in the estimation of said position of said user terminal, otherwise derived by said exchanging messages between said earth station and said user terminal via said communications satellite.

\* \* \* \* \*